United States Patent
Zhang et al.

(10) Patent No.: US 11,290,199 B2
(45) Date of Patent: Mar. 29, 2022

(54) LINK RECOVERY METHOD, TERMINAL DEVICE, AND NETWORK DEVICE

(71) Applicant: HUAWEI TECHNOLOGIES CO., LTD., Guangdong (CN)

(72) Inventors: Di Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/883,683

(22) Filed: May 26, 2020

(65) Prior Publication Data
US 2020/0287637 A1    Sep. 10, 2020

Related U.S. Application Data

(63) Continuation of application No. PCT/CN2018/116005, filed on Nov. 16, 2018.

(30) Foreign Application Priority Data

Nov. 27, 2017    (CN) .......................... 201711209646.0

(51) Int. Cl.
    *H04B 17/309*     (2015.01)
(52) U.S. Cl.
    CPC .................. *H04B 17/309* (2015.01)
(58) Field of Classification Search
    CPC .... H04B 7/0695; H04B 7/088; H04B 7/0408; H04B 17/318; H04B 17/327; H04B 7/0456
See application file for complete search history.

(56) References Cited

U.S. PATENT DOCUMENTS

| | | | | |
|---|---|---|---|---|
| 2018/0048375 A1* | 2/2018 | Guo | ..................... | H04B 7/0619 |
| 2018/0049245 A1* | 2/2018 | Islam | ..................... | H04L 5/0023 |
| 2019/0052337 A1* | 2/2019 | Kwon | ................. | H04W 72/085 |
| 2020/0037385 A1* | 1/2020 | Park | ..................... | H04W 72/04 |
| 2020/0059290 A1* | 2/2020 | Pan | ..................... | H04B 17/327 |
| 2020/0099437 A1* | 3/2020 | Harada | ................. | H04L 5/0053 |

(Continued)

FOREIGN PATENT DOCUMENTS

| CN | 101827428 A | 9/2010 |
|---|---|---|
| CN | 104285466 A | 1/2015 |
| CN | 104521281 A | 4/2015 |

(Continued)

OTHER PUBLICATIONS

Nokia, "Radio Link Monitoring in NR", 3GPP TSG RAN WG1 Meeting #90bis, R1-1718803, Prague, Czech Republic, Oct. 9-13, 2017, 4 pages.

(Continued)

*Primary Examiner* — Romani Ohri
(74) *Attorney, Agent, or Firm* — Fish & Richardson P.C.

(57) ABSTRACT

A link recovery method, a terminal device, and a network device are provided. In an embodiment, a method includes: receiving, by a terminal device from a network device, a first signaling and a second signaling, wherein the first signaling indicates one or more reference signals for detecting channel quality information, the second signaling indicates quasi co-location (QCL) information of a physical downlink control channel (PDCCH) and QCL information of the one or more reference signals.

4 Claims, 11 Drawing Sheets

(56) References Cited

U.S. PATENT DOCUMENTS

2020/0288334 A1\* 9/2020 Takeda ................. H04W 24/04
2020/0389220 A1\* 12/2020 Kang ................ H04W 72/0413

FOREIGN PATENT DOCUMENTS

| WO | 2014019131 A1 | 2/2014 |
|---|---|---|
| WO | 2014025380 A1 | 2/2014 |
| WO | 2014110758 A1 | 7/2014 |
| WO | 2017196612 A1 | 11/2017 |
| WO | 2019047671 A1 | 3/2019 |

OTHER PUBLICATIONS

3GPP TS 38.321 V1.1.0 (Nov. 2017),3rd Generation Partnership Project, Technical Specification Group Radio Access Network,NR,Medium Access Control (MAC) protocol specification(Release 15), 64 pages.
Qualcomm Incorporated, "Radio link monitoring consideration",3GPP TSG RAN WG1 Meeting NR#3, R1-1716386, Nagoya, Japan, Sep. 18-21, 2017, 10 pages.
3GPP TS 38.331 V0.1.0 (Oct. 2017),3rd Generation Partnership Project, Technical Specification Group Radio Access Network,NR, Radio Resource Control (RRC),Protocol specification(Release 15), 154 pages.
Samsung,"Beam failure recovery",3GPP TSG RAN WG1 Meeting 90bis,R1-1717606,Prague, Czech, Oct. 9-13, 2017, 7 pages.
Samsung,"Beam failure recovery",3GPP TSG RAN WG1 Meeting #91, R1-1720291, Reno, USA, Nov. 27-Dec. 1, 2017, 8 pages.
3GPP TS 38.213 V1.2.0 (Nov. 2017),3rd Generation Partnership Project,Technical Specification Group Radio Access Network,NR,Physical layer procedures for control(Release 15), 38 pages.
3GPP TS 38.214 V1.2.0 (Nov. 2017),3rd Generation Partnership Project,Technical Specification Group Radio Access Network,NR,Physical layer procedures for data (Release 15), 54 pages.
PCT International Search Report and Written Opinion in International Application No. PCT/CN2018/116,005, dated Feb. 19, 2019, 13 pages (With English Translation).
Office Action issued in Chinese Application No. 201711209646.0 dated Jul. 16, 2020, 10 pages (With English Translation).
Extended European Search Report issued in European Application No. 18880980.0 dated Nov. 20, 2020, 11 pages.
Huawei, HiSilicon, "Design of PRACH-based beam failure recovery," 3GPP TSG RAN WG1 Meeting #91, R1-1719808, Reno, USA, Nov. 27-Dec. 1, 2017, 5 pages.

\* cited by examiner

LINK RECOVERY METHOD, TERMINAL DEVICE, AND NETWORK DEVICE

CROSS-REFERENCE TO RELATED APPLICATIONS

This application is a continuation of International Application No. PCT/CN2018/116005, filed on Nov. 16, 2018, which claims priority to Chinese Patent Application No. 201711209646.0, filed on Nov. 27, 2017. The disclosures of the aforementioned applications are hereby incorporated by reference in their entireties.

TECHNICAL FIELD

This application relates to the field of communications technologies, and in particular, to a link recovery method, a terminal device, and a network device.

BACKGROUND

With increasing service requirements, spectrum resources of a wireless communications system are increasingly scarce, and a high frequency band with a wider available bandwidth becomes a candidate frequency band of a next-generation wireless communications system.

In a channel of a high frequency band, a beam is usually used as a signal bearer. However, the beam has a poor diffraction capability on a high frequency channel. When the beam is blocked, communication is interrupted. In this case, a communication link needs to be quickly recovered.

To quickly recover a communication link between a terminal device and a network device, a base station needs to configure a candidate reference signal set (candidate beam identification reference signal set) for the terminal device. The base station configures a non-contention random access channel (random access channel, RACH) resource for each reference signal in the candidate reference signal set. When a link failure occurs, the terminal device transmits a beam failure recovery request/link failure recovery request (beam failure recovery request) by using the RACH resources associated with the candidate reference signal set. After receiving the beam failure recovery request/link failure recovery request, the base station recovers the communication link.

To ensure a success rate of communication link recovery, the candidate reference signal set usually includes a plurality of reference signals. Because the base station configures the RACH resource for each reference signal, more reference signals in the candidate reference signal set require more RACH resources, causing relatively high uplink resource overheads.

SUMMARY

Embodiments of this application provide a link recovery method, to resolve a prior-art technical problem of relatively high uplink resource overheads.

According to a first aspect, an embodiment of this application provides a link recovery method. In the method, a network device first configures, for a terminal device, M resources used to carry a link recovery request signal and N1 first reference signals, where the link recovery request signal is a signal used to recover a communication link between the terminal device and the network device or reconfigure a new link when the communication link fails, the M resources are associated with the N1 first reference signals, the first reference signal is used to identify a new link. Then, the network device indicates configuration information of the M resources to the terminal device by using first signaling. Then, the terminal device determines, from the M resources based on the N1 first reference signals and N2 second reference signals and/or based on the N1 first reference signals and N3 third reference signals, P resources used to carry the link recovery request signal, and selects, from the P resources used to carry the link recovery request signal, at least one resource used to carry and send the link recovery request signal, where the M resources include the P resources, the second reference signal is used to detect a link failure, the third reference signal meets a quasi co-location QCL assumption relationship with a physical downlink control channel PDCCH, and M, N1, N2, N3, and P are integers greater than or equal to 1.

In the foregoing technical solution, after configuring, for the terminal device, the plurality of reference signals and the corresponding resources that are used to recover the communication link between the terminal device and the network device, the network device further filters the plurality of reference signals and the resources. For example, the network device filters out some reference signals used to detect a link failure and/or some reference signals that meet the QCL assumption relationship with the PDCCH and resources associated with the some reference signals. Therefore, the network device and the terminal device can recover the communication link by using only some of the plurality of reference signals and some of the corresponding resources. Naturally, the filtered-out reference signals do not need to occupy resources used to carry the link recovery request signal. For example, a resource that is used to carry the link recovery request signal and that is corresponding to a filtered-out reference signal may be released, so that uplink resource overheads are reduced while a success rate of communication link recovery is not affected.

In a possible implementation, the P resources are associated with a reference signal other than a target reference signal in the N1 first reference signals, and the target reference signal is at least one of the N2 second reference signals and/or at least one of the N3 third reference signals. Alternatively, the P resources are at least one of resources that are in the M resources and that are not associated with a target reference signal in the N1 first reference signals, or the P resources are at least one of resources that are in the M resources and that are associated with a reference signal other than a target reference signal in the N1 first reference signals.

In the foregoing solution, the target reference signal is first filtered out from the N1 first reference signals, and then resources associated with remaining reference signals in the N first reference signals are the P resources.

In a possible implementation, before the terminal device selects the at least one resource used to carry and send the link recovery request signal, the network device sends second signaling to the terminal device, where the second signaling indicates the N3 third reference signals, and at least one of the N3 third reference signals is the target reference signal. The terminal device receives the second signaling.

In the foregoing technical solution, the network device indicates, to the terminal device, the third reference signal that meets the QCL assumption relationship with the PDCCH, so that the terminal device determines the target reference signal based on the third reference signal.

In a possible implementation, in addition to indicating the third reference signal by using the second signaling, the network device may further indicate other content. For example:

the second signaling is used to instruct the terminal device to detect a link failure by using the target reference signal in the N first reference signals; or the second signaling is used to instruct the terminal device to detect a link failure by using the N3 third reference signals: or the second signaling is used to indicate QCL information of the N2 second reference signals.

In a possible implementation, the second signaling is used to instruct to forbid the terminal device to identify a new link by using the target reference signal; or the second signaling is used to instruct the terminal device to identify a new link by using a reference signal other than the target reference signal in the N1 first reference signals.

In a possible implementation, before the terminal device selects the at least one resource used to carry and send the link recovery request signal, the network device sends third signaling to the terminal device, where the third signaling indicates the N2 second reference signals, and at least one of the N2 second reference signals is the target reference signal. The terminal device receives the third signaling.

In the foregoing technical solution, the network device indicates, to the terminal device, the second reference signal that is used to detect a link failure, so that the terminal device determines the target reference signal based on the second reference signal.

In a possible implementation, in addition to indicating the second reference signal by using the third signaling, the network device may further indicate other content. For example:

the third signaling is used to instruct to forbid the terminal device to identify a new link by using the target reference signal; or the third signaling is used to instruct the terminal device to identify a new link by using a reference signal other than the target reference signal in the N1 first reference signals.

The terminal device may further determine the P resources in another manner. For example:

In a possible implementation, before the terminal device selects the at least one resource used to carry and send the link recovery request signal, the network device sends fourth signaling to the terminal device, where the fourth signaling indicates K1 first reference signals, the P resources are associated with the K1 first reference signals, the N1 first reference signals include the K1 first reference signals, and K1 is an integer greater than or equal to 1 and less than or equal to N1. The terminal device receives the fourth signaling.

In a possible implementation, before the terminal device selects the at least one resource used to carry and send the link recovery request signal, the network device sends fifth signaling to the terminal device, where the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1. The terminal device receives the fifth signaling.

In a possible implementation, before the terminal device selects the at least one resource used to carry and send the link recovery request signal, the network device sends sixth signaling to the terminal device, where the sixth signaling indicates L resources used to carry the link recovery request signal, and the P resources are resources other than the L resources in the M resources or the P resources are the L resources. The terminal device receives the sixth signaling.

In the foregoing technical solution, the terminal device may directly determine the P resources based on the signaling sent by the network device, so that an operation workload of the terminal device is reduced, and duration required for link recovery can be reduced.

In a possible implementation, the first signaling, the second signaling, the third signaling, the fourth signaling, the fifth signaling, and the sixth signaling each are at least one of layer 1 signaling, layer 2 signaling, and layer 3 signaling.

In the foregoing technical solution, a signaling type of each piece of signaling may be at least one of the layer 1 signaling, the layer 2 signaling, and the layer 3 signaling, and the network device may flexibly configure the signaling type.

According to a second aspect, an embodiment of this application provides a link recovery method. In the method, a network device first configures, for a terminal device, M resources used to carry a link recovery request signal and N first reference signals, where the link recovery request signal is a signal used to recover a communication link between the terminal device and the network device or reconfigure a new link when the communication link fails, the M resources are associated with the N1 first reference signals, the first reference signal is used to identify a new link. Then, the network device indicates configuration information of the M resources to the terminal device by using first signaling. Then, the terminal device determines, from the M resources based on the N1 first reference signals and N2 second reference signals and/or based on the N1 first reference signals and N3 third reference signals, S resources that are not used to carry the link recovery request signal, and uses at least one resource other than S resources that are not used to carry the link recovery request signal and that are associated with a target reference signal, to carry and send the link recovery request signal, where the second reference signal is used to detect a link failure, the third reference signal meets a quasi co-location QCL assumption relationship with a physical downlink control channel PDCCH, and M, N1, N2, N3, and S are integers greater than or equal to 1. In addition, the network device can also determine and release the S resources based on the N1 first reference signals and the N2 second reference signals and/or based on the N first reference signals and the N3 third reference signals.

In the foregoing technical solution, after configuring, for the terminal device, the plurality of reference signals and the corresponding resources that are used to recover the communication link between the terminal device and the network device, the network device further filters the plurality of reference signals and the resources. For example, the network device releases some reference signals used to detect a link failure and/or some reference signals that meet the QCL assumption relationship with the PDCCH and resources associated with the some reference signals. Therefore, the network device and the terminal device can recover the communication link by using only some of the plurality of reference signals and some of the corresponding resources, so that uplink resource overheads are reduced while a success rate of communication link recovery is not affected.

In a possible implementation, the network device sends second signaling to the terminal device, where the second signaling indicates the N3 third reference signals, at least one of the N3 third reference signals is the target reference signal, and the network device releases a resource that is associated with the at least one reference signal and that is used to carry the link recovery request signal. After receiving the second signaling, the terminal device determines the target reference signal based on the second signaling.

In the foregoing technical solution, the network device indicates, to the terminal device, the third reference signal that meets the QCL assumption relationship with the PDCCH, so that the network device can release, based on the third reference signal, a resource associated with the target reference signal, and the terminal device determines the target reference signal based on the third reference signal.

In a possible implementation, in addition to indicating the third reference signal by using the second signaling, the network device may further indicate other content. For example:

the second signaling is used to instruct the terminal device to detect a link failure by using the target reference signal in the N first reference signals; or the second signaling is used to instruct the terminal device to detect a link failure by using at least one of the N3 third reference signals; or the second signaling is used to indicate QCL information of the N2 second reference signals.

In a possible implementation, the second signaling is used to instruct to forbid the terminal device to identify a new link by using the target reference signal; or the second signaling is used to instruct the terminal device to identify a new link by using a reference signal other than the target reference signal in the N1 first reference signals.

In a possible implementation, the network device sends third signaling to the terminal device, where the third signaling indicates the N2 second reference signals, and at least one of the N2 second reference signals is the target reference signal. The network device releases a resource that is associated with the at least one reference signal and that is used to carry, the link recovery request signal. After receiving the third signaling, the terminal device determines the target reference signal based on the third signaling.

In the foregoing technical solution, the network device indicates, to the terminal device, the second reference signal that is used to detect a link failure, so that the network device can release, based on the second reference signal, a resource associated with the target reference signal, and the terminal device determines the target reference signal based on the second reference signal.

In a possible implementation, in addition to indicating the second reference signal by using the third signaling, the network device may further indicate other content. For example, the third signaling is used to instruct to forbid the terminal device to identify a new link by using the target reference signal: or the third signaling is used to instruct the terminal device to identify a new link by using a reference signal other than the target reference signal in the N first reference signals.

The terminal device and the network device may further determine the S resources in another manner. For example:

In a possible implementation, the network device sends fourth signaling to the terminal device, where the fourth signaling indicates K1 first reference signals, a reference signal other than the K1 first reference signals in the N1 first reference signals is the target reference signal, the N1 first reference signals include the K1 first reference signals, and K1 is an integer greater than or equal to 1 and less than or equal to N1. The network device releases a resource that is associated with a first reference signal other than the K1 first reference signals in the N1 first reference signals and that is used to carry the link recovery request signal. After receiving the fourth signaling, the terminal device determines the target reference signal based on the fourth signaling.

In a possible implementation, the network device sends fifth signaling to the terminal device, where the fifth signaling indicates K2 first reference signals, the K2 first reference signals are the target reference signal, and the N1 first reference signals include the K2 first reference signals. The network device releases a resource that is associated with the K2 first reference signals and that is used to carry the link recovery request signal. After receiving the fifth signaling, the terminal device determines the target reference signal based on the fifth signaling.

In a possible implementation, the network device sends sixth signaling to the terminal device, where the sixth signaling indicates L resources used to carry the link recovery request signal, and the S resources are resources other than the L resources in the M resources or the S resources are the L resources. The network device releases a resource other than the L resources in the M resources or releases the L resources. After receiving the sixth signaling, the terminal device determines the target reference signal based on the sixth signaling.

In the foregoing technical solution, the terminal device may directly determine the P resources based on the signaling sent by the network device, so that an operation workload of the terminal device is reduced, and duration required for link recovery can be reduced.

In a possible implementation, the first signaling, the second signaling, the third signaling, the fourth signaling, the fifth signaling, and the sixth signaling each are at least one of layer 1 signaling, layer 2 signaling, and layer 3 signaling.

In the foregoing technical solution, a signaling type of each piece of signaling may be at least one of the layer 1 signaling, the layer 2 signaling, and the layer 3 signaling, and the network device may flexibly configure the signaling type.

According to a third aspect, an embodiment of this application provides a reference signal determining method, where the method includes: receiving, by the terminal device, second signaling sent by the network device, where the second signaling indicates N3 third reference signals, and the third reference signal meets a quasi co-location QCL assumption relationship with a physical downlink control channel PDCCH: and determining, by the terminal device, that at least one of the N3 third reference signals is a reference signal that is not used to recover a communication link between the terminal device and the network device, or determining, by the terminal device, that at least one of the N3 third reference signals is a reference signal used to detect a link failure.

Optionally, in the foregoing technical solution, the terminal device may implicitly indicate the N3 third reference signals based on physical downlink control channel PDCCH QCL information indicated by the network device, thereby reducing signaling overheads.

In a possible implementation, in addition to indicating the third reference signal, the second signaling may implicitly indicate other content. For example:

the second signaling is used to instruct the terminal device to detect a link failure by using the at least one reference signal in N1 first reference signals, where the first reference signal is used to identify a new link: or the second signaling is used to instruct the terminal device to detect a link failure by using the N3 third reference signals; or the second signaling is used to indicate QCL information of N2 second reference signals.

Because the second signaling may indicate a plurality of types of information, signaling and resource overheads can be reduced.

In a possible implementation, the second signaling is used to instruct to forbid the terminal device to identify a new link by using the at least one reference signal: or the second signaling is used to instruct the terminal device to identify a new link by using a reference signal other than the at least one reference signal in the N first reference signals.

According to a fourth aspect, an embodiment of this application provides a reference signal determining method, where the method includes: receiving, by the terminal device, third signaling sent by the network device, where the third signaling indicates N2 second reference signals, and the second reference signal is used to detect a link failure: and determining, by the terminal device, that at least one of the N2 second reference signals is a reference signal that is not used to recover a communication link between the terminal device and the network device.

In the foregoing technical solution, the terminal device may determine, based on the reference signal that is used to detect a link failure and that is indicated by the network device, the reference signal that cannot be used to recover the communication link between the terminal device and the network device. A processing method is simple, and an operation workload of the terminal device can be reduced.

In a possible implementation, in addition to indicating the second reference signal, the third signaling may implicitly indicate other content. For example:

the third signaling is used to instruct to forbid the terminal device to identify a new link by using the target reference signal: or the third signaling is used to instruct the terminal device to identify a new link by using a reference signal other than the target reference signal in the N1 first reference signals.

According to a fifth aspect, an embodiment of this application provides a terminal device. The terminal device has functions of implementing behavior of the terminal device in the methods in the first aspect and the second aspect. The functions may be implemented by hardware, or may be implemented by hardware by executing corresponding software. The hardware or software includes one or more modules corresponding to the foregoing functions.

In a possible design, a structure of the terminal device includes a processor and a transceiver. The processor is configured to support the terminal device in performing corresponding functions in the methods in the first aspect and the second aspect. The transceiver is configured to support communication between the terminal device and another device, and send or receive information or an instruction to/from the another device in the method in the first aspect. The terminal device may further include a memory. The memory is configured to couple to the processor, and the memory stores a necessary program instruction and necessary data.

According to a sixth aspect, an embodiment of this application provides a network device. The network device has functions of implementing behavior of the network device in the methods in the first aspect and the second aspect. The functions may be implemented by hardware, or may be implemented by hardware by executing corresponding software. The hardware or software includes one or more modules corresponding to the foregoing functions.

In a possible design, a structure of the network device includes a processor and a transceiver. The processor is configured to support the network device in performing corresponding functions in the methods in the first aspect and the second aspect. The transceiver is configured to support communication between the network device and another device, and send or receive information or an instruction to/from the another device in the method in the first aspect. The network device may further include a memory. The memory is configured to couple to the processor, and the memory stores a necessary program instruction and necessary data.

According to a seventh aspect, an embodiment of this application provides a computer storage medium, configured to store a computer software instruction used to perform the functions in the first aspect, any design of the first aspect, and the second aspect, and including a program designed to perform the method in the first aspect, any design of the first aspect, and the second aspect.

According to an eighth aspect, an embodiment of this application provides a computer program product. The computer program product includes an instruction; when the instruction is run on a computer, the computer is enabled to perform the method according to the first aspect, any design of the first aspect, and the second aspect.

According to a ninth aspect, an embodiment of this application further provides a chip system. The chip system includes a processor, configured to support a terminal device in implementing the methods in the first aspect and the second aspect, or configured to support a network device in implementing the methods in the first aspect and the second aspect, for example, generating or processing data and/or information in the foregoing methods. In a possible design, the chip system further includes a memory. The memory is configured to store a program instruction and data that are necessary for a mobile edge computing device or the network device. The chip system may include a chip, or may include a chip and another discrete device.

DESCRIPTION OF EMBODIMENTS

Figure 1:
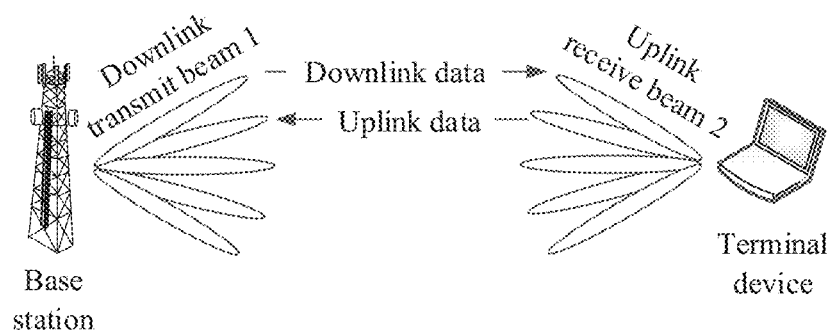
FIG. 1 is a schematic diagram of a scenario to which an embodiment of this application is applied.

To make the objectives, technical solutions, and advantages of the embodiments of this application clearer, the following further describes the embodiments of the present invention in detail with reference to the accompanying drawings.

The technical solutions in the embodiments of this application may be applied to various communications systems, such as a new radio (New Radio, NR) system, a Wireless Fidelity (wifi) system, a worldwide interoperability for microwave access (Worldwide Interoperability for Microwave Access, WiMAX) system, a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, a long term evolution-advanced (Advanced long term evolution, LTE-A) system, a universal mobile telecommunications system (Universal Mobile Telecommunication System. UMTS), a cellular system related to the third generation partnership project (The 3rd Generation Partnership Project, 3GPP), and a fifth generation mobile communications system (The Fifth Generation, 5G).

The following describes some terms in this application, to facilitate understanding for a person skilled in the art.

(1) A network device, for example, a base station (for example, an access point), may be a device that communicates with a wireless terminal device by using one or more sectors over an air interface in an access network. The network device may be configured to mutually convert a received over-the-air frame and an IP packet and serve as a router between the terminal device and a rest part of the access network. The rest part of the access network may include an IP network. The network device may coordinate attribute management of the air interface. For example, the base station may be an evolved NodeB (NodeB, eNB or e-NodeB, evolutional NodeB) in a long term evolution (Long Term Evolution, LTE) system or an LTE-advanced system (LTE-Advanced, LTE-A) or a next generation NodeB (next generation NodeB, gNB) in a 5G system. This is not limited in the embodiments of this application.

(2) A terminal device may be a device that provides a user with voice and/or data connectivity, for example, may be a handheld device with a wireless connection function, or a processing device connected to a wireless modem. The terminal device may communicate with a core network by using a radio access network (Radio Access Network, RAN), and exchange voice and/or data with the RAN. The terminal device may be user equipment (User Equipment, UE), a wireless terminal device, a mobile terminal device, a subscriber unit (Subscriber Unit), a subscriber station (Subscriber Station), a mobile station (Mobile Station), a mobile console (Mobile), a remote station (Remote Station), an access point (Access Point, AP), a remote terminal device (Remote Terminal), an access terminal device (Access Terminal), a user terminal device (User Terminal), a user agent (User Agent), a user device (User Device), or the like. For example, the terminal device may include a mobile phone (or referred to as a "cellular" phone), a computer having a mobile terminal device, a portable, pocket-sized, handheld, computer-embedded, or vehicle-mounted apparatus, or a smart wearable device. For example, the terminal device may be a device such as a personal communication service (Personal Communication Service, PCS) phone, a cordless telephone set, a session initiation protocol (SIP) phone, a wireless local loop (Wireless Local Loop, WLL) station, a personal digital assistant (Personal Digital Assistant, PDA), a smart watch, a smart helmet, smart glasses, or a smart band. The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

(3) A beam (beam) is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a mixed digital/analog beamforming technology. Different beams may be considered as different resources. Same information or different information may be sent by using different beams. Optionally, a plurality of beams having same or similar communication features may be considered as one beam. One beam may include one or more antenna ports and is configured to transmit a data channel, a control channel, a sounding signal, and the like. For example, a transmit beam may be distribution of signal strength formed in different directions in space after a signal is transmitted through an antenna, and a receive beam may be distribution of signal strength that is of a wireless signal received from the antenna and that is in different directions in space. It may be understood that, one or more antenna ports forming one beam may also be considered as one antenna port set.

In the embodiments of this application, the "beam" may alternatively be referred to as a "reference signal", a "shaped beam", or the like. In other words, a name of the "beam" is not limited herein, provided that the foregoing concept is expressed.

(4) Beam pair link (beam pair link, BPL): A concept of the beam pair link is based on a concept of a beam. One beam pair link usually includes one transmit beam at a transmit end and one receive beam at a receive end. For example, the beam pair link may include a transmit beam of a base station and a receive beam of UE.

(5) A quasi co-location (Quasi-Co-Location, QCL) assumption relationship may be used to assist in describing beamforming information and a receiving procedure on a receive side of a terminal device. The QCL may include some spatial feature parameters, for example, angle of departure-related parameters such as an azimuth angle of departure (Azimuth angle of Departure, AoD), a zenith angle of departure (Zenith angle of Departure, ZoD), an azimuth angle spread of departure (Azimuth angle spread of Departure, ASD), and a zenith angle spread of departure (Zenith angle spread of Departure, ZSD), or angle of arrival-related parameters such as an azimuth angle of arrival (Azimuth angle of Arrival. AoA), a zenith angle of arrival (Zenith angle of Arrival. ZoA), an azimuth angle spread of arrival (Azimuth angle spread of Arrival, ASA), and a zenith angle spread of arrival (Zenith angle spread of Arrival, ZSA), or a spatial receive parameter (Spatial Rx parameter), a delay spread, a Doppler spread, a Doppler frequency shift, an average gain, or an average delay. These spatial feature parameters describe features of spatial channels between antenna ports for reference signals. In this way, assistance in beamforming or a receiving processing process on the receive side of the terminal device can be completed. Certainly, the spatial feature parameters included in the QCL may alternatively be another parameter other than the foregoing parameters. This is not limited herein.

(6) A random access channel (random access channel, RACH) resource may be, for example, a physical random access channel (physical random access channel, PRACH) resource or a physical uplink control channel (physical uplink control channel, PUCCH), or certainly, may be another channel resource. The resource includes a time-frequency code. When a terminal device selects a group of determined random access resources, a time, a frequency, and a preamble that are used by the terminal device to initiate random access are determined.

(7) Beam state information (beam state information, BSI), or referred to as beam measurement information, may alternatively have another name, and mainly includes a beam index and at least one of reference signal received power (reference signal received power, RSRP), reference signal received quality (reference signal receiving quality, RSRQ), a signal to interference plus noise ratio (signal to interference plus noise ratio, SINR), a signal-to-noise ratio (signal-to-noise ratio, SNR), a channel quality indicator (Channel Quality Indicator, CQI), and a hypothetical PDCCH block error rate (hypothetical PDCCH block error rate, hypothetical PDCCH BLER) of a beam. Certainly, another parameter may also be included. This is not limited herein.

(8) A communication link failure may alternatively be referred to as any name of a communication link fault, a communication link failure, a beam fault, a beam failure, a link fault, a link failure, a communication fault, a communication failure, and the like. The communication link failure may include, for example, but is not limited to, one of the following cases: 1. Communication fails when quality of a beam used by a network device to send PDCCH information and a beam used by a terminal to receive PDCCH information declines to a sufficiently low level, that is, a communication link fails when quality of a beam pair link used to transmit the PDCCH declines to a sufficiently low level. That quality declines to a sufficiently low level may be but is not limited to: for example, quality of a signal received by the terminal is less than a threshold, or the terminal cannot receive a signal in a preset time window. 2. The network device configures, for the terminal, a reference signal resource that meets a quasi co-location QCL relationship with a control channel. When channel quality of the reference signal resource is lower than a threshold, it is considered that communication fails. Generally, the threshold (for example, the threshold in cases 1 and 2) is less than or equal to a channel quality threshold that is set during recovery of communication between the terminal and the network device.

(9) A link recovery request signal is a signal used to recover a communication link between a terminal device and a network device or reconfigure a new link when the communication link fails or after the communication link fails. The signal may also be referred to as any one of a beam recovery request signal, a beam failure recovery request signal, a link failure recovery request signal, a link reconfiguration signal, a link failure reconfiguration request signal, a link reconfiguration request signal, and a link failure reconfiguration request signal. Certainly, the signal may alternatively have another name. This is not limited herein.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, unless otherwise specified.

Next, an application scenario of the embodiments of this application is briefly described.

FIG. 1 shows a scenario to which an embodiment of this application is applied. FIG. 1 includes a base station and a terminal device located in a coverage area of the base station. The base station and the terminal device transmit data by using a plurality of beam pair links. For example, the base station sends downlink data to the terminal device by using a downlink transmit beam 1, and the terminal device receives, by using an uplink receive beam 2, the downlink data sent by the base station.

A high frequency band causes a relatively large wireless transmission loss. A beamforming technology may limit energy of a transmitted signal in a beam direction to improve an antenna gain. Therefore, in a wireless communications system, the beamforming technology is usually used to compensate for the loss in a transmission process. For example, a beamforming-based reference signal transmission mechanism is used to transmit data, and a beamformed reference signal may include a broadcast channel, a synchronization signal, a cell-specific reference signal, and the like.

When a reference signal is transmitted based on the beamforming technology, once the terminal device moves, a direction of a shaped beam corresponding to the transmitted signal may no longer match a location of the terminal device after the movement. Therefore, during communication between the terminal device and the base station, the terminal device needs to frequently switch between different shaped beams. To ensure a success rate of switching between shaped beams, channel quality corresponding to each shaped beam needs to be obtained before the switching. For example, the channel quality may be measured by the terminal device based on a synchronization signal or a cell-specific reference signal obtained after beamforming, and then the terminal device reports a measurement result to the base station by using a physical uplink control channel or a physical uplink shared channel.

Figure 2:
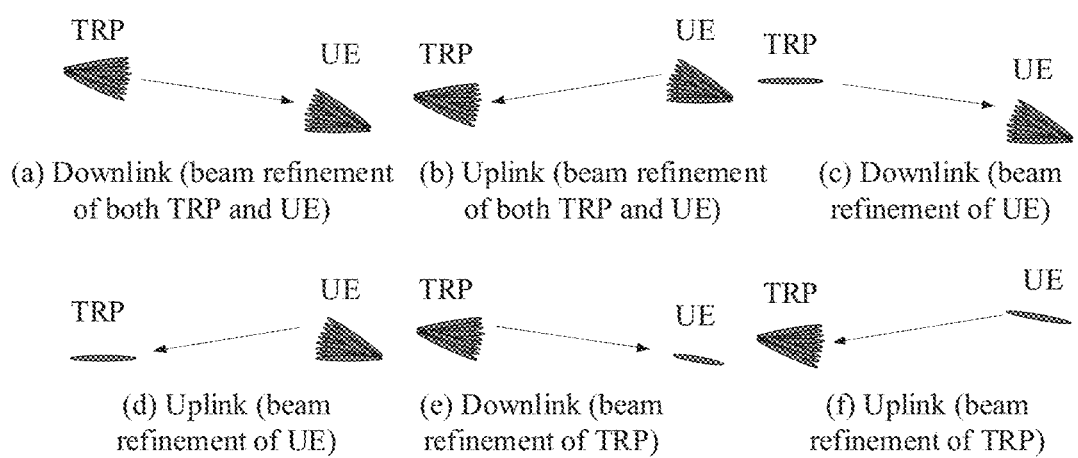
FIG. 2 is a schematic diagram of a channel quality measurement process in the prior art.

A channel quality measurement process is shown in FIG. 2. First, the base station sends a plurality of shaped beams to the terminal device. Then, the terminal device measures the plurality of shaped beams sent by the base station, selects W shaped beams with better measurement results, and reports BSI of the W shaped beams with the better measurement results to the base station. As shown in FIG. 2(a), the W shaped beams are downlink transmit beams of the base station. Then, the base station separately trains a plurality of uplink and downlink transmit beams, to determine receive beams corresponding to the uplink and downlink transmit beams, as shown in FIG. 2(e) and FIG. 2(f). Measurement of downlink transmit beams and downlink receive beams is completed. Uplink transmit beams and uplink receive beams are measured in a same manner, as shown in FIG. 2(b), FIG. 2(c), and FIG. 2(d), and details are not described herein again.

After completing the foregoing measurement process, the base station obtains N beam pair links BPLs that provide better communication with the terminal device. The N beam pair links BPLs may be used for downlink transmission or uplink transmission. For example, the N beam pair links BPLs are N<Bx, B'x> and/or N<By, B'y>. Bx represents a transmit beam of the base station, namely, a downlink transmit beam, B'x represents a receive beam of the terminal device, namely, a downlink receive beam, By represents a transmit beam of the terminal device, namely, an uplink transmit beam, and B'y represents a receive beam of the base station, namely, an uplink receive beam.

When a beam is blocked, to prevent interruption of communication between the base station and the terminal device, after obtaining a plurality of beam pair links BPLs from a plurality of time units, the base station determines a candidate reference signal set from the plurality of beam pair links BPLs. Certainly, configuration of the candidate reference signal set is not limited to this manner, and is not listed one by one herein. In addition, the base station configures a corresponding uplink resource, such as a random access resource or a physical uplink control channel resource, for each reference signal in the candidate reference signal set. When determining that a communication link to the base station fails, the terminal device needs to recover a communication connection to the base station. In this case, the terminal device sends a beam failure recovery request/link failure recovery request by using RACH resources associated with one or more reference signals in the candidate reference signal set, to recover a downlink.

In the prior art, the candidate reference signal set usually includes a plurality of reference signals, and more RACH resources need to be configured for the plurality of reference signals. Consequently, uplink resource overheads are relatively high.

In view of this, the embodiments of the present invention provide a link recovery method. In the method, a network device first configures, for a terminal device, M resources used to carry a link recovery request signal and N1 first reference signals, where the link recovery request signal is a signal used to recover a communication link between the terminal device and the network device or reconfigure a new link when the communication link fails, the M resources are associated with the N1 first reference signals, and the first reference signal is used to identify a new link. Then, the network device indicates configuration information to the terminal device by using first signaling. Then, the terminal device determines, from the M resources based on the N1 first reference signals and N2 second reference signals and/or based on the N1 first reference signals and N3 third reference signals. P resources used to carry the link recovery request signal, and selects, from the P resources used to carry the link recovery request signal, at least one resource used to carry and send the link recovery request signal, where the M resources include the P resources, the second reference signal is used to detect a link failure, the third reference signal meet a quasi co-location QCL assumption relationship with a physical downlink control channel PDCCH, and M, N1, N2, N3, and P are integers greater than or equal to 1.

In the foregoing technical solution, after configuring, for the terminal device, the plurality of reference signals and the corresponding resources that are used to recover the communication link between the terminal device and the network device, the network device further filters the plurality of reference signals and the resources. For example, the network device filters out some reference signals used to detect a link failure and/or some reference signals that meet the QCL assumption relationship with the PDCCH and resources associated with the some reference signals. Therefore, the network device and the terminal device can recover the communication link by using only some of the plurality of reference signals and some of the corresponding resources. Naturally, the filtered-out reference signals do not need to occupy resources used to carry the link recovery request signal. For example, a resource that is used to carry the link recovery request signal and that is corresponding to a filtered-out reference signal may be released, so that uplink resource overheads are reduced while a success rate of communication link recovery is not affected.

The following describes the technical solutions provided in the embodiments of this application with reference to the accompanying drawings. In the following description process, an example in which the technical solutions provided in the present invention are applied to the application scenario shown in FIG. 1 and a network device is a base station and a terminal device is UE is used.

Figure 3A:
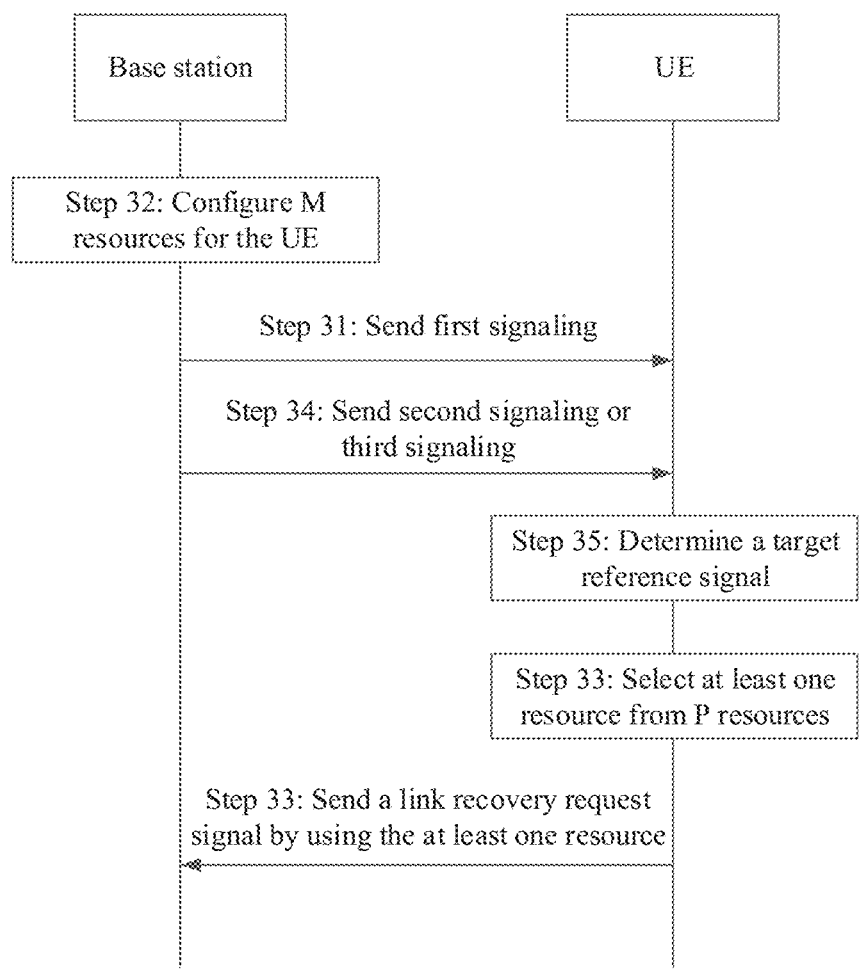
FIG. 3A and FIG. 3B are flowcharts of a link recovery method according to an embodiment of this application.

FIG. 3 shows a link recovery method according to an embodiment of this application. A procedure of the method is described as follows:

Step 31: A base station sends first signaling to UE.

In this embodiment of this application, the first signaling is used to configure M resources used to carry a link recovery request signal, and the link recovery request signal is used to recover a communication link between the terminal device and the network device or reconfigure a new link when the communication link fails. The link recovery request signal may alternately be referred to as a link reconfiguration request signal. The first signaling may be media access control (media access control, MAC-CE) signaling, or may be downlink control information (downlink control information, DCI) signaling, or may be radio resource control (radio resource control, RRC) signaling. This is not limited herein. In the following description, an example in which the signal is referred to as the link recovery request signal is used for description.

The resource used to carry the link recovery request signal may be a PUCCH resource, a PRACH resource, or another channel resource. In the following description, an example in which the resource used to carry the link recovery request signal is the PRACH resource is used for description. The base station may randomly select some of a plurality of PRACH resources as resources used by the UE to carry the link recovery request signal, or may configure the M resources for the UE in another manner. This is not limited herein. To describe the link recovery method in this application more clearly, the following uses an example in which the base station uses channel resources corresponding to a plurality of reference signals as the M resources used to carry the link recovery request signal for description.

In this embodiment of this application, before the base station performs step 31, the method may further include step 32: The base station configures the M resources for the UE.

In this embodiment of this application, the base station may first configure a plurality of reference signals for the UE, and then configure the M resources based on the reference signals. The reference signals may include N first reference signals, N2 second reference signals, and N3 third reference signals. The base station may configure the three types of reference signals for the UE at the same time: or may first configure the first reference signal, then configure the second reference signal, and finally configure the third reference signal; or may first configure the second reference signal, then configure the third reference signal, and finally configure the first reference signal. In other words, a configuration sequence of the three reference signals is not limited. Certainly, the base station may also determine a reference signal for another purpose. In this embodiment of this application, an example in which the base station configures the N1 first reference signals, the N2 second reference signals, and the N3 third reference signals for the UE is merely used for description. M, N1, N2, and N3 are integers greater than or equal to 1.

The following describes functions of the first reference signal, the second reference signal, and the third reference signal.

The first reference signal is used to identify a new link. Identifying a new link is a process in which the UE may select, by measuring quality of the N1 first reference signals, PRACH resources corresponding to one or more first reference signals that meet a preset condition, to determine that the resources are a new link for communication between the UE and the base station. The preset condition may be that quality of a first reference signal is higher than a preset threshold. Alternatively, the first reference signal may be referred to as a reference signal that is configured by the base station for the UE and that is used to recover the communication link between the UE and the base station, or may be referred to as a reference signal whose channel quality meets a preset threshold condition. The preset threshold condition may be that channel quality is greater than or equal to a value of a specific parameter. For example, a threshold condition may be set based on BSI of a reference signal. Taking RSPR as an example, the preset threshold condition may be that the RSPR is greater than or equal to −60 dBm. Certainly, another threshold condition may alternately be used. This is not limited herein.

The second reference signal is used to detect a link failure. To be specific, the UE may determine, by detecting channel quality of the second reference signal, whether the communication link between the UE and the base station fails. When channel quality of all the second reference signals is lower than a preset threshold, or when channel quality of a preset quantity of second reference signals in the N2 second reference signals is lower than a preset threshold, it is determined that the communication link between the UE and the base station fails. It should be noted that, optionally, the second reference signal herein is a reference signal that meets a QCL assumption relationship with a DMRS of a PDCCH, and details are not described herein.

The third reference signal is a reference signal that meets the quasi co-location QCL assumption relationship with the physical downlink control channel (physical downlink control channel, PDCCH), in other words, a reference signal that meets the QCL assumption relationship with a demodulation reference signal (demodulation reference signal, DMRS) of the PDCCH.

A process in which the base station configures the plurality of reference signals for the UE is the same as that in the prior art, and details are not described herein.

After the base station configures the plurality of reference signals for the UE, the base station configures, for the UE based on the first reference signal in the plurality of reference signals, the M resources used to carry the link recovery request signal. In this embodiment of this application, the M resources that are configured by the base station for the UE and that are used to carry the link recovery request signal are associated with the N1 first reference signals. To be specific, reference signals in the N1 first reference signals are in a one-to-one correspondence with the PRACH resources, or one PRACH resource may be configured for a plurality of first reference signals in the N1 first reference signals, or a plurality of PRACH resources may be configured for one first reference signal by the base station. This is not limited herein.

It should be noted that the M resources are associated with the N1 first reference signals. Therefore, the first signaling sent by the base station may indicate only the M resources, and the UE may learn, based on the M resources, the N1 first reference signals configured by the base station for the UE. Alternatively, the base station may indicate both the M resources and the N1 first reference signals in the first signaling. This is not limited in this embodiment of this application.

Step 33: The UE selects, from P resources used to carry the link recovery request signal, at least one resource used to carry and send the link recovery request signal.

After the UE receives the first signaling sent by the base station, the UE learns of the M resources configured by the base station for the UE. Because the M resources are used to recover the communication link between the UE and the base station, if the M resources are occupied, for example, if a reference signal corresponding to a resource in the M resources is used to detect whether the communication link between the UE and the base station fails, or if a reference signal corresponding to a resource meets the QCL assumption relationship with the PDCCH, when a link failure occurs between the UE and the base station, the UE may not be able to quickly recover communication with the base station by using the resource. Therefore, in this embodiment of this application, after learning of the M resources, the UE needs to select, from the M resources, the P resources used to carry the link recovery request signal. In this way, when determining that the communication link between the UE and the base station fails, the UE selects one or more resources from the P resources to send the link recovery request signal.

In this embodiment of this application, the M resources include the P resources, and the P resources are determined in the following two manners:

Manner 1:

The P resources are resources determined by the UE based on the N1 first reference signals and the N2 second reference signals and/or the P resources are resources determined by the UE based on the N1 first reference signals and the N3 third reference signals. P is an integer greater than or equal to 1 and less than M. Specifically, the P resources may be determined by the UE based on the first reference signal and the second reference signal, or may be determined by the UE based on the first reference signal and the third reference signal, or may be determined by the UE based on the first reference signal, the second reference signal, and the third reference signal.

Manner 2:

The P resources are determined by the UE according to an instruction sent by the base station. For example, the base station may indicate some resources to the UE. The resources are the P resources, or resources other than the some resources indicated by the base station in the M resources are the P resources.

The following describes the two manners in detail.

For the manner 1:

The P resources are associated with a reference signal other than a target reference signal in the N1 first reference signals, and the target reference signal is at least one of the N2 second reference signals and/or at least one of the N3 third reference signals. The P resources are at least one of resources that are in the M resources and that are not associated with the target reference signal in the N1 first reference signals, or the P resources are at least one of resources that are in the M resources and that are associated with a reference signal other than the target reference signal in the N1 first reference signals. In other words, in this embodiment of this application, a resource associated with the second reference signal and/or the third reference signal in the M resources is removed, so that the UE recovers the communication link by using only remaining resources. Therefore, a reference signal that is the same as the second reference signal and/or the third reference signal and that is in the N1 first reference signals do/does not need to occupy a resource used to carry the link recovery request signal, thereby reducing overheads of uplink resources.

Figure 4:
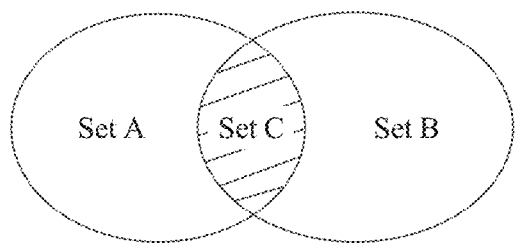
FIG. 4 to FIG. 7 are schematic diagrams of four cases of a target reference signal according to an embodiment of this application.

In this embodiment of this application, the target reference signal may be in the following four cases:

Case 1: The target reference signal is a reference signal that is in the first reference signals and that is used to detect a link failure. In this case, the target reference signal is in an intersection set of the N1 first reference signals and the N2 second reference signals. Referring to FIG. 4, assuming that the N1 first reference signals form a set A, and the N2 second reference signals form a set B, the target reference signal is a reference signal included in a set C.

Figure 5:
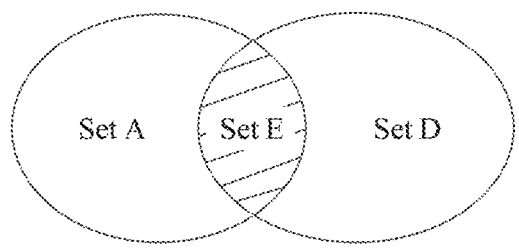

Case 2: The target reference signal is a reference signal that is in the first reference signals and that meets the QCL assumption relationship with the PDCCH. In this case, the target reference signal is in an intersection set of the N1 first reference signals and the N3 third reference signals. Referring to FIG. 5, assuming that the N1 first reference signals form a set A, and the N3 third reference signals form a set D, the target reference signal is a reference signal included in a set E.

Figure 6:
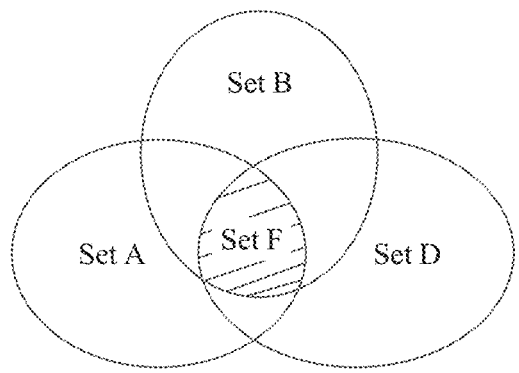

Case 3: The target reference signal is a reference signal that is in the first reference signals and that can be used to detect a link failure and can meet the QCL assumption relationship with the PDCCH. In this case, the target reference signal is in an intersection set of the N1 first reference signals, the N2 second reference signals, and the N3 third reference signals. Referring to FIG. 6, assuming that the N1 first reference signals form a set A, the N3 third reference signals form a set D. and the N2 second reference signals form a set B, the target reference signal is a reference signal included in a set F.

Figure 7:
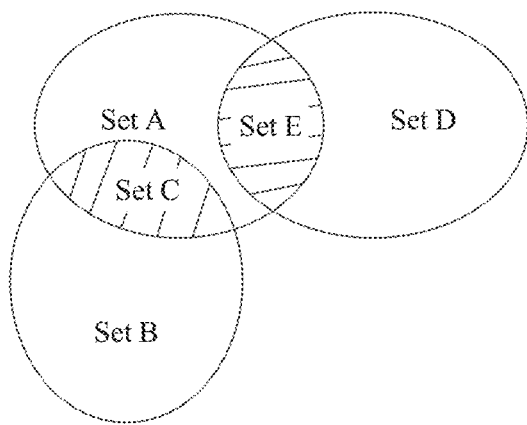

Case 4: The target reference signal is in a union of a reference signal that is in the first reference signals and that meets the QCL assumption relationship with the PDCCH and a reference signal that is in candidate reference signals and that is used to detect a link failure. In this case, the target reference signal is in a union of two intersection sets, a first intersection set is an intersection set of the N1 first reference signals and the N2 second reference signals, and a second intersection set is an intersection set of the N1 first reference signals and the N3 third reference signals. Referring to FIG. 7, assuming that the N first reference signals form a set A, the N3 third reference signals form a set D. and the N2 second reference signals form a set B, the target reference signal is a reference signal included in a set C and a set E.

Certainly, the target reference signal may alternatively be in other combined cases, and these are not listed one by one in this embodiment of this application.

The UE needs to learn of the N2 second reference signal and/or the N3 third reference signals configured by the base station for the UE when determining the target reference signal. Therefore, referring to FIG. 3A, before step 33 is performed, this embodiment of this application further includes the following steps.

Step 34: The base station sends second signaling or third signaling.

In this embodiment of this application, the second signaling indicates the N3 third reference signals, and at least one of the N3 third reference signals is the target reference signal. A signaling type of the first signaling may be RRC signaling, and a signaling type of the second signaling may be RRC signaling, MAC-CE signaling, or DCI signaling. Alternatively, a signaling type of the first signaling may be MAC-CE signaling, and a signaling type of the second signaling may be DCI signaling. For a signaling type of the third signaling, refer to the second signaling. Details are not described herein again.

It should be noted that the first signaling and the second signaling may be a plurality of pieces of signaling, or may be one piece of signaling. The second signaling and the third signaling may also be same signaling.

In this embodiment of this application, the second signaling may directly indicate indexes or other identification information of the N3 third reference signals, or the second signaling is used to indicate QCL information of the N3 third reference signals. The QCL information indicates that the DMRS of the PDCCH meets the QCL assumption relationship with the third reference signal, and therefore indirectly indicates the third reference signal.

In this embodiment of this application, in addition to indicating the N3 third reference signals, the second signaling may further implicitly indicate the following information. To be specific, a same field in the second signaling may indicate the N3 third reference signals, and may further indicate the following information:

1. The second signaling is used to instruct the UE to detect a link failure by using the target reference signal in the N1 first reference signals.

To be specific, after receiving the second signaling, the UE determines the N3 third reference signals and determines to detect, by using a first reference signal that is in the N1 first reference signals and that meets the QCL assumption relationship with the PDCCH, whether the link fails.

2. The second signaling is used to instruct the UE to detect a link failure by using the N3 third reference signals.

In other words, after receiving the second signaling, the UE determines that the N3 third reference signals are the N2 second reference signals. In this case, the second signaling indicates QCL information of the PDCCH, to be specific, the DMRS of the PDCCH meets the QCL relationship with the N3 third reference signals, and also indicates QCL information of the N2 second reference signals.

3. The second signaling is used to instruct to forbid the UE to use the target reference signal to identify a new link.

To be specific, after receiving the second signaling, the UE determines the N3 third reference signals and determines not to detect a new link by using a first reference signal that is in the N1 first reference signals and that meets the QCL assumption relationship with the PDCCH.

4. The second signaling is used to instruct the UE to identify a new link by using a reference signal other than the target reference signal in the N1 first reference signals.

To be specific, after receiving the second signaling, the UE determines the N3 third reference signals and determines to detect a new link by using a first reference signal other than a reference signal that meets the QCL assumption relationship with the PDCCH in the N1 first reference signals.

5. The second signaling is used to instruct the UE to detect a link failure by using the target reference signal in the N1 first reference signals, and the second signaling is used to instruct to forbid the UE to identify a new link by using the target reference signal.

6. The second signaling is used to instruct the UE to detect a link failure by using the target reference signal in the N1 first reference signals, and the second signaling is used to instruct the UE to identify a new link by using a reference signal other than the target reference signal in the N1 first reference signals.

7. The second signaling is used to instruct the UE to detect a link failure by using the N3 third reference signals, and the second signaling is used to instruct to forbid the UE to identify a new link by using the target reference signal.

8. The second signaling is used to instruct the UE to detect a link failure by using the N3 third reference signals, and the second signaling is used to instruct the UE to identify a new link by using a reference signal other than the target reference signal in the N1 first reference signals.

Content of the sixth to the eighth indications is a combination of that of the foregoing four indications, and details are not described herein again. Certainly, a person skilled in the art may also determine other combinations of indication content according to the first to the eighth cases, and examples are not listed one by one herein.

It should be noted that after the base station indicates, to the UE, the N3 third reference signals allocated to the UE, the base station may also determine the target reference signal based on the signaling, so that the base station also determines the foregoing first to eighth indication content.

In addition, it should be noted that "forbid to do" may be understood as "not do". For example, that the second signaling is used to instruct to forbid the UE to identify a new link by using the target reference signal may be understood as: the second signaling is used to instruct the UE not to identify a new link by using the target reference signal. That the base station determines to detect a link failure by using the target reference signal in the N1 first reference signals may be understood as: the base station activates the target reference signal in the N1 first reference signals to detect a link failure. Similarly, that the base station determines not to identify a new link by using the target reference signal may be understood as: the base station deactivates the target reference signal in the N1 first reference signals. Other indication content in the signaling may be understood in a same manner, and details are not described herein again.

If the base station determines not to identify a new link by using a reference signal, the base station may release a resource associated with the reference signal. For example, if the base station indicates the N3 third reference signals, the base station may release a PRACH resource associated with a reference signal that is in the N1 first reference signals and that intersects with the indicated reference signals.

It should be noted that, a step in which the base station deactivates the target reference signal based on the signaling or activates, based on the signaling, the target reference signal as a reference signal used to detect a link failure is an optional step. That is, this step is not necessary.

In this embodiment of this application, the third signaling indicates the N2 second reference signals, and at least one of the N2 second reference signals is the target reference signal.

In this embodiment of this application, the third signaling may directly indicate indexes or other identification information of the N2 second reference signals.

In this embodiment of this application, in addition to indicating the N2 second reference signals, the third signaling may further indicate the following information:

1. The third signaling is used to instruct to forbid the UE to detect a new link by using the target reference signal in the N first reference signals.

To be specific, after receiving the third signaling, the UE determines the N2 second reference signals and determines not to detect a new link by using a reference signal that is in the N first reference signals and that is used to detect a link failure.

2. The third signaling is used to instruct the UE to identify a new link by using a reference signal other than the target reference signal in the N1 first reference signals.

To be specific, after receiving the third signaling, the UE determines the N2 second reference signals and determines to detect a new link by using a first reference signal other than a reference signal that is used to detect a link failure in the N1 first reference signals.

It should be noted that after the base station indicates, to the UE, the N2 second reference signals allocated to the UE, the base station may also determine the target reference signal based on the signaling, so that the base station also determines the foregoing first and second indication content.

In addition, it should be further noted that, that the base station determines to detect a new link by using a reference signal other than the target reference signal in the N1 first reference signals may be understood as: the base station deactivates the target reference signal. Similarly, that the base station determines not to identify a new link by using the target reference signal may be understood as: the base station deactivates the target reference signal in the N1 first reference signals.

If the base station determines not to identify a new link by using a reference signal, the base station may release a resource associated with the reference signal. For example, if the base station indicates the N2 second reference signals, the base station may release a PRACH resource associated with a reference signal that is in the N1 first reference signals and that intersects with the indicated reference signals.

It should be noted that, a step in which the base station deactivates the target reference signal based on the signaling or activates, based on the signaling, the target reference signal as a reference signal that is used to detect a link failure is an optional step. That is, this step is not necessary.

Step 35: The UE determines the target reference signal.

When the UE receives the second signaling or the third signaling sent by the base station, the UE determines that at least one of the N3 third reference signals indicated by the second signaling is the target reference signal, or the UE determines that at least one of the N2 second reference signals indicated by the third signaling is the target reference signal.

Specifically, after determining the N3 third reference signals, the UE determines a reference signal the same as the N1 first reference signals in the N3 third reference signals, and the same reference signal is the target reference signal. Alternatively, after determining the N2 second reference signals, the UE determines a reference signal the same as the N1 first reference signals in the N2 second reference signals, and the same reference signal is the target reference signal.

1 After step 35 is performed, step 33 is performed.

After the UE determines the target reference signal, the UE determines that resources, other than a resource associated with the target reference signal, in the M resources are the P resources used to carry the link recovery request signal.

For example, the target reference signals are a first reference signal 1 and a first reference signal 2, PRACH resources associated with the first reference signal 1 are a PRACH resource 1 and a PRACH resource 2, and a PRACH resource associated with a first reference signal 2 is a PRACH resource 3. Therefore, the UE determines to remove the PRACH resource 1 to the PRACH resource 3 from the M resources, and remaining PRACH resources are the P resources that can be used to carry the link recovery request signal.

When the UE determines that the communication link between the UE and the base station fails, or after the communication link fails, the UE may detect channel quality of first reference signals associated with the P resources, and select one or more resources from the P resources based on the channel quality to send the link recovery request signal. After the base station responds to the link recovery request signal, the UE recovers the communication link with the base station.

Figure 3B:
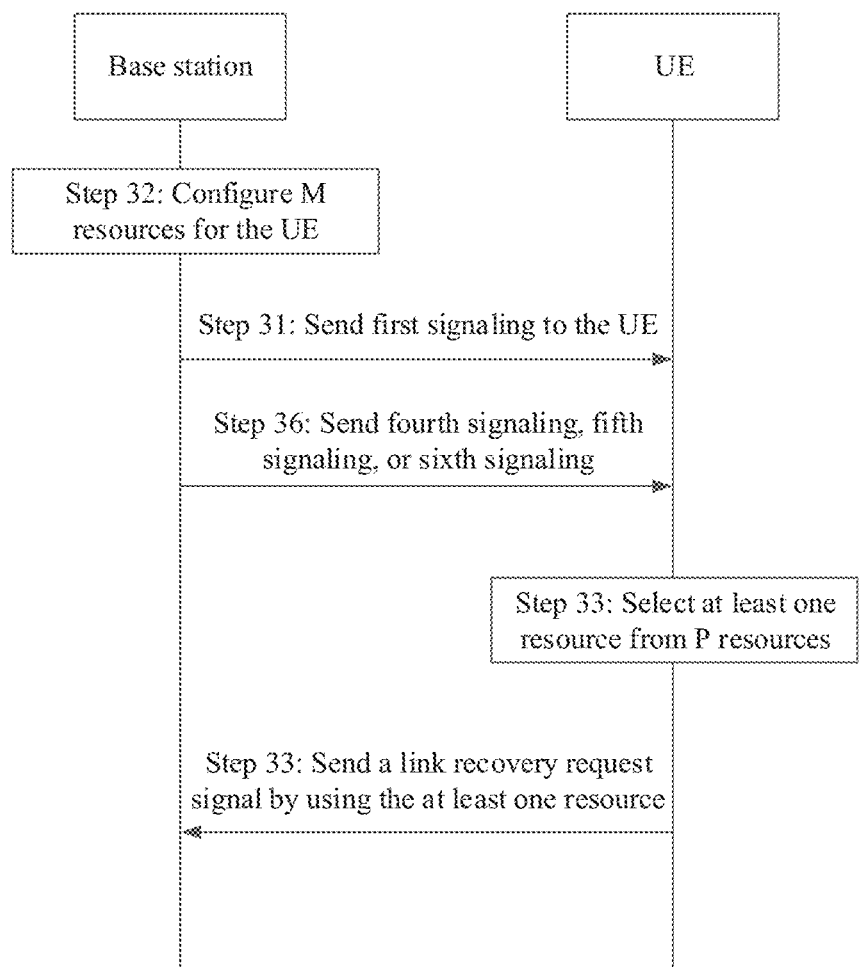

For the manner 2:

Referring to FIG. 3B, before step 33 is performed, this embodiment of this application further includes the following step.

Step 36: The base station sends fourth signaling, fifth signaling, or sixth signaling.

In this embodiment of this application, the fourth signaling indicates K1 first reference signals, the P resources are associated with the K1 first reference signals, the N1 first reference signals include the K1 first reference signals, and K1 is an integer greater than or equal to 1 and less than or equal to N1. In this embodiment of this application, a signaling type of the first signaling may be RRC signaling, and a signaling type of the fourth signaling may be RRC signaling, MAC-CE signaling, or DCI signaling. Alternatively, a signaling type of the first signaling may be MAC-CE signaling, and a signaling type of the fourth signaling may be DCI signaling. For signaling types of the fifth signaling and the sixth signaling, refer to the fourth signaling. Details are not described herein again.

In this embodiment of this application, the fourth signaling may directly indicate indexes or other identification information of the K1 first reference signals. The fourth signaling indicates that the K1 first reference signals are reference signals finally used to recover the communication link between the UE and the base station. When K1=N1, all the M resources configured by the base station for the UE can be used to carry the link recovery request signal, and P=M. In this case, the base station may not send the fourth signaling. For example, the base station and the UE agree that if no signaling other than the first signaling is sent within a preset time, it is considered by default that P=M. Certainly, the base station and the UE may alternatively implement the foregoing objective in another implementation. This is not limited herein.

It should be noted that after the base station indicates the K1 first reference signals to the UE, the base station may also determine, based on the signaling, that resources associated with the K1 first reference signals are the P resources used to carry the link recovery request signal.

In addition, it should be noted that, that the base station determines the P resources used to carry the link recovery request signal may be understood as: the base station activates the K1 first reference signals to recover the communication link between the UE and the base station, or the base station may release a PRACH resource associated with a first reference signal other than the K1 first reference signals in the N1 first reference signals.

Certainly, a step in which the base station activates, based on the signaling, the K1 first reference signals to recover the communication link between the UE and the base station or a step in which the base station releases, based on the signaling, the PRACH resource associated with the first reference signal other than the K1 first reference signals in the N1 first reference signals is an optional step. That is, this step is not necessary.

In this embodiment of this application, the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1.

In this embodiment of this application, the fifth signaling may directly indicate indexes or other identification information of the K2 first reference signals. The fifth signaling indicates that the K2 first reference signals are reference signals that are finally not used to recover the communication link between the UE and the base station.

It should be noted that after the base station indicates the K2 first reference signals to the UE, the base station may also determine, based on the signaling, that resources associated with the K2 first reference signals are not the resources used to carry the link recovery request signal.

In addition, it should be noted that, that the base station determines that the resources associated with the K2 first reference signals are not the resources used to carry the link recovery request signal may be understood as: the base station deactivates the K2 first reference signals, or the base station may release PRACH resources associated with the K2 first reference signals.

Certainly, a step in which the base station deactivates the K2 first reference signals based on the signaling or a step in which the base station releases, based on the signaling, the PRACH resources associated with the K2 first reference signals is an optional step. That is, this step is not necessary.

In this embodiment of this application, the sixth signaling indicates L resources used to carry the link recovery request signal, the P resources are resources other than the L resources in the M resources or the P resources are the L resources, and the M resources include the L resources.

In this embodiment of this application, the sixth signaling may directly indicate indexes or other identification information of the L resources used to carry the link recovery request signal. The sixth signaling indicates that the L resources are resources finally used to carry the link recovery request signal or the L resources are resources that are finally not used to carry the link recovery request signal. Specifically, meanings represented by the L resources indicated by the sixth signaling may be agreed on between the base station and the UE. For example, the base station and the UE agree that if the signaling indicates L resources, the resources are considered by default as resources used to carry the link recovery request signal; after receiving the signaling, the UE determines that the L resources are the P resources.

It should be noted that after the base station indicates the L resources to the UE, the base station also determines that the L resources are resources used to carry the link recovery request signal or the L resources are resources not used to carry the link recovery request signal.

In addition, it should be noted that, that the base station determines that the L resources are resources used to carry the link recovery request signal may be understood as: the base station activates first reference signals associated with the L resources. In addition, that the base station determines that the L resources are resources not used to carry the link recovery request signal may be understood as: the base station deactivates a first reference signal associated with a resource other than the L resources in the M resources, or may be understood as: the base station releases the L resources.

Certainly, a step in which the base station activates, based on the signaling, the first reference signals associated with the L resources, or a step in which the base station deactivates, based on the signaling, the first reference signal associated with the resource other than the L resources in the M resources, or releases the L resources is an optional step. That is, this step is not necessary.

After step 36 is performed, step 33 is performed.

A performing process of step 33 is the same as that in the manner 1, and details are not described herein again.

It should be noted that the first signaling, the second signaling, the third signaling, the fourth signaling, the fifth signaling, and the sixth signaling each are at least one of layer 1 signaling, layer 2 signaling, and layer 3 signaling. The layer 1 signaling may be MAC-CE signaling, the layer 2 signaling may be DCI signaling, and the layer 3 signaling may be RRC signaling. Any one of the first signaling to the sixth signaling may be any one or more of the three types of signaling. For example, the first signaling may be sent for a plurality of times, the layer 3 signaling is used for the first time, and the layer 2 signaling is used for the second time. Certainly, the first signaling may be sent by using different types of signaling during sending of one time. This is not limited herein.

The first signaling and the second signaling are respectively: optionally the RRC signaling and the RRC signaling and/or the MAC-CE signaling and/or the DCI signaling (preferably the RRC signaling and the MAC-CE signaling or the DCI signaling). Optionally, the first signaling is the MAC-CE signaling, and the second signaling is the DCI signaling.

In addition, a transmission speed of the layer 1 signaling and a transmission speed of the layer 2 signaling are higher than that of the layer 3 signaling. Therefore, to enable the UE to determine, as soon as possible, a resource used to carry the link recovery request signal, a signaling level of the second signaling to the sixth signaling that are sent by the base station may be higher than that of the first signaling. For example, when the first signaling is the RRC signaling, the second signaling to the sixth signaling may be the MAC-CE signaling or the DCI signaling. When the first signaling is the MAC-CE signaling, the second signaling to the sixth signaling may be the DCI signaling.

The following describes, by using a specific example, the target reference signal and a possible processing process of the base station for the target reference signal and a PRACH resource associated with the target reference signal in this embodiment of this application. In the following example, the base station configures three reference signal sets for the UE by using the method in step 31. The three reference signal sets are a set A, a set B, and a set C. The set A is a set including the N3 third reference signals. To be specific, the set A is a set of reference signals that meet the QCL assumption relationship with the PDCCH. The set B is a set including the N2 second reference signals. To be specific, the set B is a set of reference signals used to detect a link failure. The set C is a set including the N1 first reference signals. To be specific, the set C is a set of reference signals used to recover the communication link between the UE and the base station. The set A is a subset of a resource pool set M, the set B is a subset of a resource pool set N. and the set C is a subset of a resource pool set K.

Figure 8:
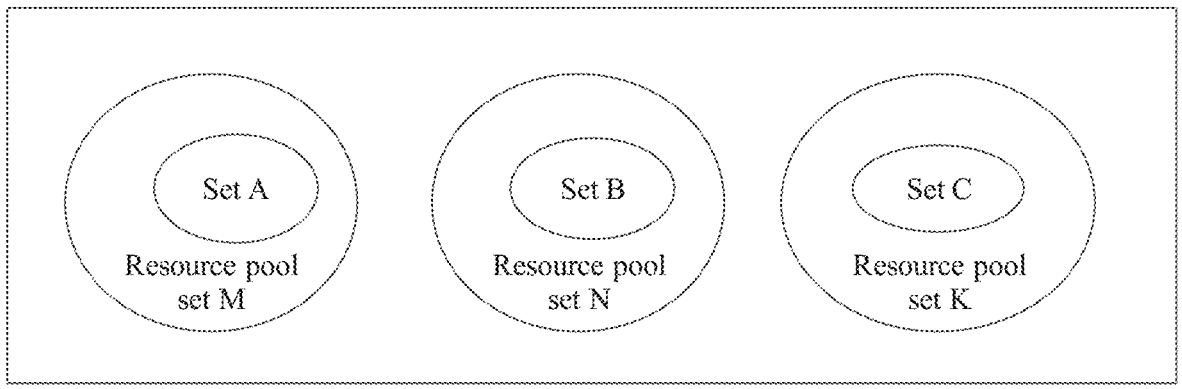
FIG. 8 to FIG. 17 are schematic diagrams of an example of a target reference signal according to an embodiment of this application.

Referring to FIG. 8, an intersection set of any two of the resource pool set M, the resource pool set N, and the resource pool set K is an empty set. In this case, the target reference signal is an empty set, and the base station may not need to release PRACH resources associated with the reference signals in the set C.

Figure 9:
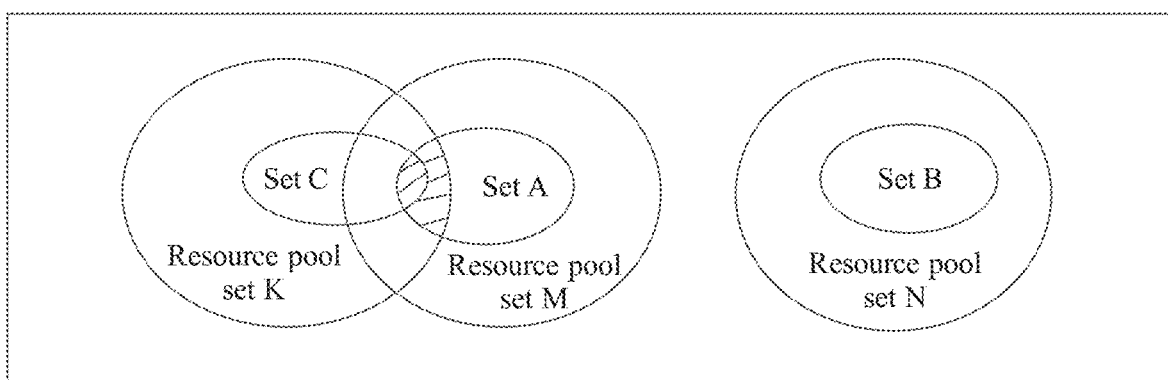

Referring to FIG. 9, an intersection set of the resource pool set M and the resource pool set N is an empty set, and an intersection set of the resource pool set M and the resource pool set K is not an empty set. When the base station activates the set A by using signaling, the target reference signals are some reference signals of the set A in the set C or some reference signals of the set A in the resource pool set K. The base station may deactivate the some reference signals of the set A in the set C, or the base station may deactivate the some reference signals of the set A in the resource pool set K, to release PRACH resource corresponding to the some reference signals.

Figure 10:
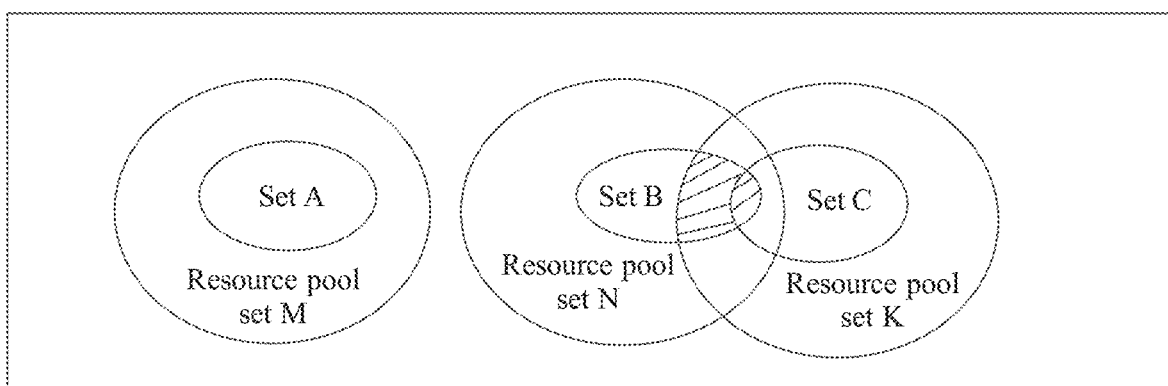

Referring to FIG. 10, an intersection set of the resource pool set M and the resource pool set N is an empty set, and an intersection set of the resource pool set N and the resource pool set K is not an empty set. When the base station activates the set B by using signaling, the target reference signals are some reference signals of the set B in the set C or some reference signals of the set B in the resource pool set K. The base station may deactivate the some reference signals of the set B in the set C, or the base station may deactivate the some reference signals of the set B in the resource pool set K, to release PRACH resources corresponding to the some reference signals.

Figure 11:
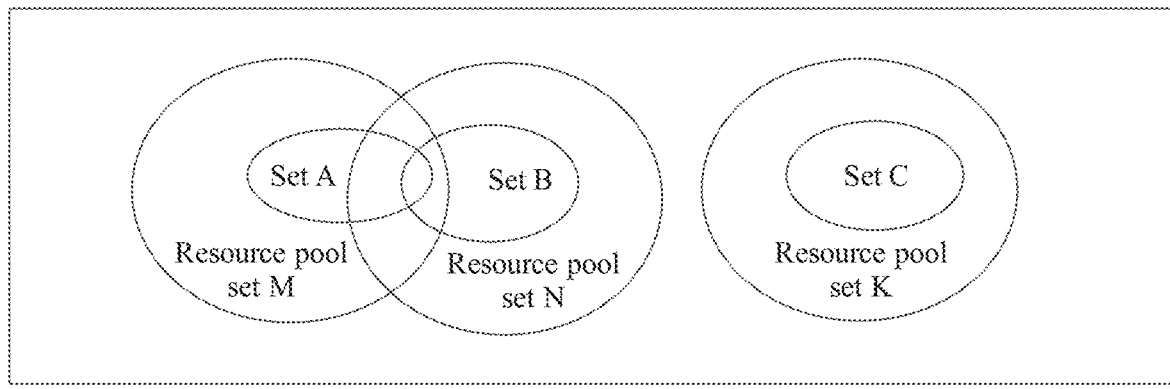

Referring to FIG. 11, an intersection set of the resource pool set M and the resource pool set N is not an empty set, and an intersection set of the resource pool set N and the resource pool set K is an empty set. In this case, the target reference signal is an empty set, and the base station may not need to release PRACH resources associated with the reference signals in the set C.

Figure 12:
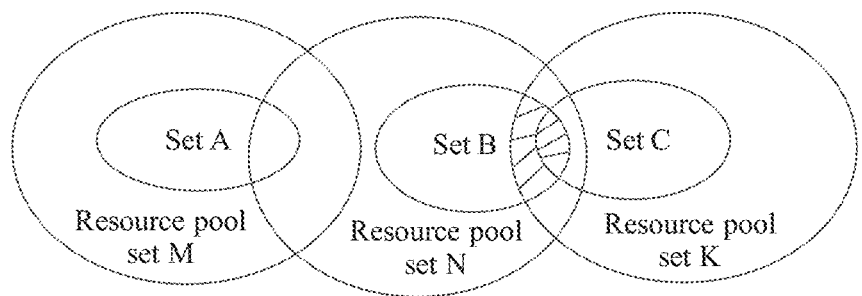

Referring to FIG. 12, an intersection set of the resource pool set M and the resource pool set N is not an empty set, and an intersection set of the resource pool set N and the resource pool set K is not an empty set. When the base station activates the set B by using signaling, the target reference signals are some reference signals of the set B in the set C or some reference signals of the set B in the resource pool set K. The base station may deactivate the some reference signals of the set B in the set C, or the base station may deactivate the some reference signals of the set B in the resource pool set K, to release PRACH resources corresponding to the some reference signals.

Figure 13:
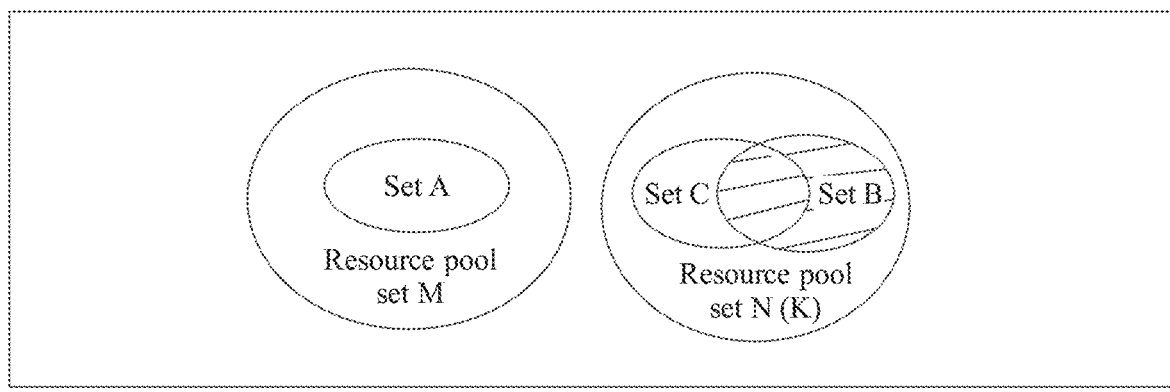

Referring to FIG. 13, the resource pool set N is the same as the resource pool set K, an intersection set of the resource pool set M and the resource pool set N is an empty set, and a union of the set B and the set C is not the set N. When the base station activates the set B by using signaling, the target reference signals are some reference signals of the set B in the set C or some reference signals of the set B in the resource pool set K. The base station may deactivate the some reference signals of the set B in the set C. or the base station may deactivate the some reference signals of the set B in the resource pool set K, to release PRACH resources corresponding to the some reference signals.

Figure 14:
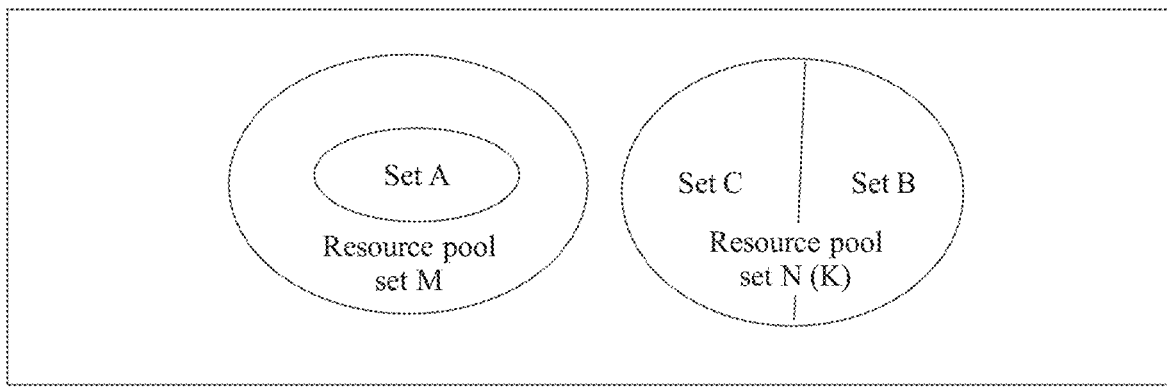

Referring to FIG. 14, the resource pool set N is the same as the resource pool set K, an intersection set of the resource pool set M and the resource pool set N is an empty set, a union of the set B and the set C is the set N, and the set B and the set C have no intersection set. When the base station activates the set B by using signaling, the target reference signal is an empty set. In this case, the base station may directly activate a remaining reference signal in the resource pool set N as a candidate reference signal, and does not need to release any PRACH resource.

Figure 15:
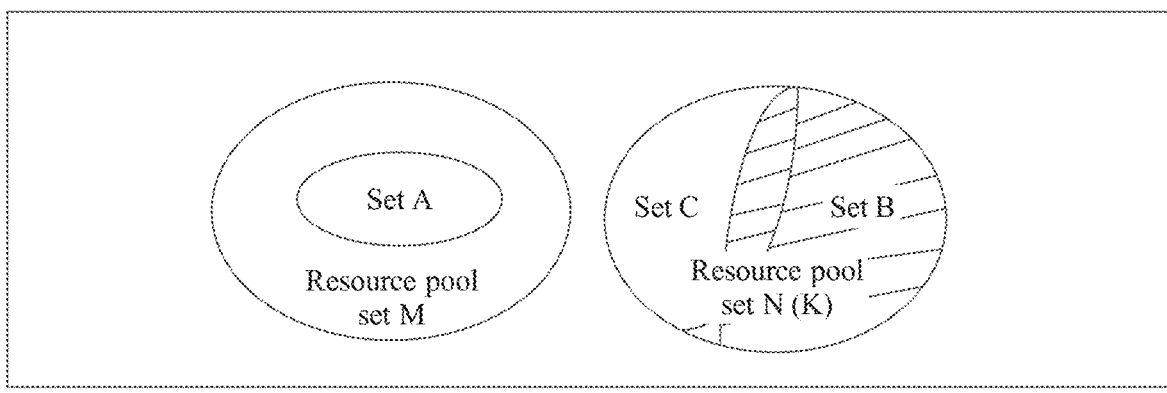

Referring to FIG. 15, the resource pool set N is the same as the resource pool set K, an intersection set of the resource pool set M and the resource pool set N is an empty set, a union of the set B and the set C is the set N, and the set B and the set C have an intersection set. When the base station activates the set B by using signaling, the target reference signals are some reference signals of the set B in the set C or some reference signals of the set B in the resource pool set K. The base station may deactivate the some reference signals of the set B in the set C. or the base station may deactivate the some reference signals of the set B in the resource pool set K, to release PRACH resources corresponding to the some reference signals.

Figure 16:
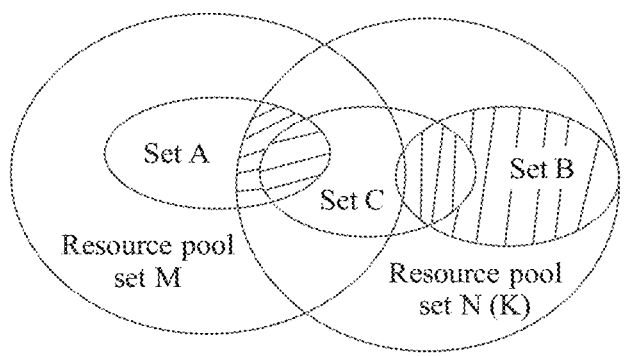

Referring to FIG. 16, the resource pool set N is the same as the resource pool set K, an intersection set of the resource pool set M and the resource pool set N is not an empty set, and a union of the set B and the set C is not the set N. When the base station activates the set A or the set B by using signaling, the target reference signals are some reference signals of the set A or the set B in the set C or the target reference signals are some reference signals of the set A or the set B in the resource pool set K. The base station may deactivate the some reference signals of the set A or the set B in the set C, or the base station may deactivate the some reference signals of the set A or the set B in the resource pool set K, to release PRACH resources corresponding to the some reference signals.

Figure 17:
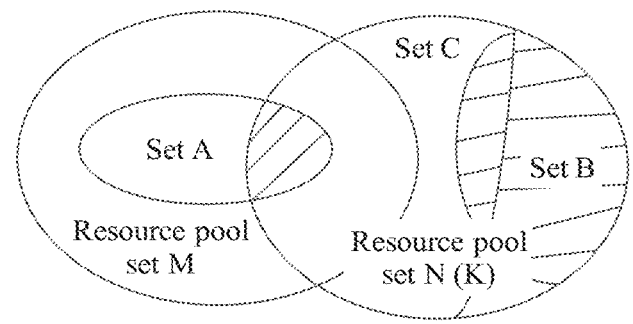

Referring to FIG. 17, the resource pool set N is the same as the resource pool set K, an intersection set of the resource pool set M and the resource pool set N is not an empty set, and a union of the set B and the set C is the set N. When the base station activates the set A or the set B by using signaling, the base station may directly activate remaining reference signals other than the set B in the resource pool set N as candidate reference signals. In this case, the target reference signals are some reference signals of the set A or the set B in the set C or the target reference signals are some reference signals of the set A or the set B in the resource pool set K. The base station may further deactivate the some reference signals of the set A or the set B in the set C, or the base station may deactivate the some reference signals of the set A or the set B in the resource pool set K, to release PRACH resources corresponding to the some reference signals.

Figure 18A:
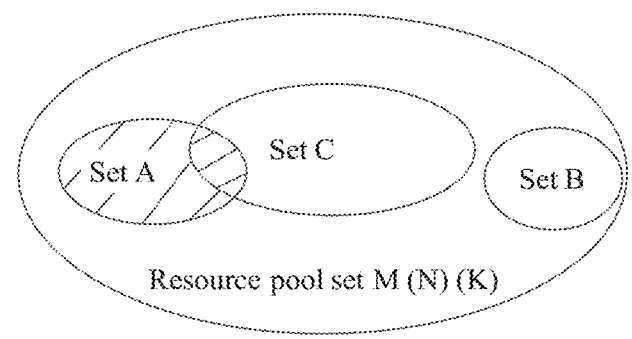
FIG. 18A to FIG. 18C are schematic diagrams of another example of a target reference signal according to an embodiment of this application.
Figure 18B:
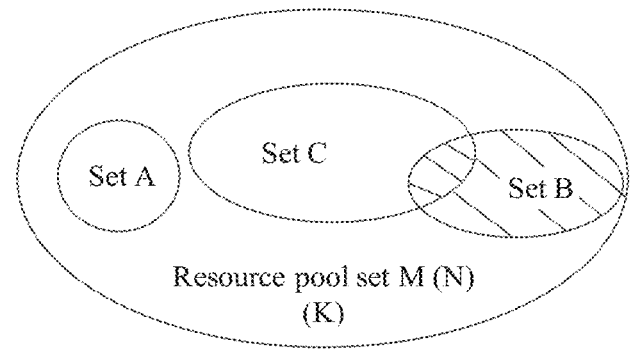
Figure 18C:
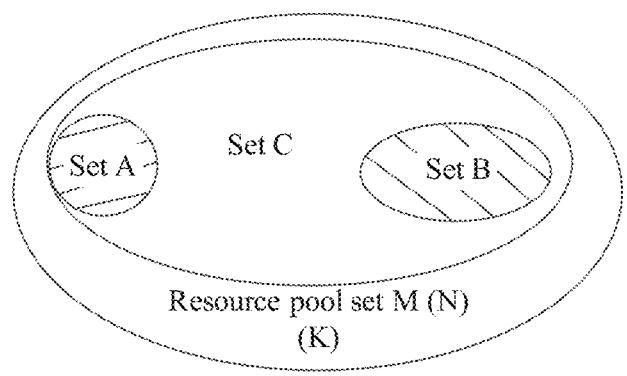

Referring to FIG. 18A to FIG. 18C, the resource pool set N, the resource pool set M, and the resource pool set K are the same. When the base station activates the set A by using signaling, the target reference signals are some reference signals of the set A in the set C, or the target reference signals are some reference signals of the set A in the resource pool set K. The base station may deactivate the some reference signals of the set A in the set C or the resource pool set K, to release PRACH resources corresponding to the some reference signals, as shown in FIG. 18A. Alternatively, when the base station activates the set B, the target reference signals are some reference signals of the set B in the set C, or the target reference signals are some reference signals of the set B in the resource pool set K. The base station may deactivate the some reference signals of the set B in the set C or the set K, to release PRACH resources corresponding to the some reference signals, as shown in FIG. 18B. Alternatively, when there are intersection sets between the set A, the set B, and the set C, and the base station activates the set A and the set B by using signaling, the target reference signals are the set A and the set B. The base station activates remaining reference signals in the set N as the set C, to release PRACH resources corresponding to the reference signals in the set A and the set B, as shown in FIG. 18C.

In the foregoing technical solution, after configuring, for the terminal device, the plurality of reference signals and the corresponding resources that are used to recover the communication link between the terminal device and the network device, the network device further filters the plurality of reference signals and the resources. For example, the network device filters out some reference signals used to detect a link failure and/or some reference signals that meet the QCL assumption relationship with the PDCCH and resources associated with the some reference signals. Therefore, the network device and the terminal device can recover the communication link by using only some of the plurality of reference signals and some of the corresponding resources. Naturally, the filtered-out reference signals do not need to occupy any resource. For example, a resource corresponding to a filtered-out reference signal may be released, so that uplink resource overheads are reduced while a success rate of communication link recovery is not affected.

In the foregoing embodiments provided in this application, the link recovery method provided in the embodiments of this application is described separately from a perspective of network elements and from a perspective of interaction between the network elements. It can be understood that to implement the foregoing functions, network elements, for example, the UE and the base station, include a corresponding hardware structure and/or a corresponding software module that perform/performs the functions. A person of ordinary skill in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 19:
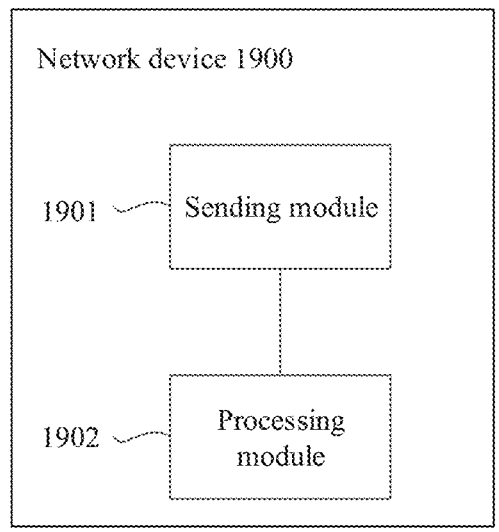
FIG. 19 is a possible schematic structural diagram of a network device according to an embodiment of this application.

FIG. 19 is a possible schematic structural diagram of a network device 1900. The network device 1900 may implement functions of the base station in the foregoing embodiments. The network device 1900 includes a sending module 1901 and a processing module 1902.

The sending module 1901 is configured to send first signaling to a terminal device.

The first signaling is used to configure M resources used to carry a link recovery request signal, the link recovery request signal is a signal used to recover a communication link between the terminal device and the network device or reconfigure a new link when the communication link fails, the M resources are associated with N1 first reference signals, and the first reference signal is used to identify a new link.

The processing module 1902 is configured to detect the link recovery request signal from P resources used to carry the link recovery request signal.

The M resources include the P resources, the P resources are resources determined by the network device based on the N1 first reference signals and N2 second reference signals and/or the P resources are resources determined by the network device based on the N1 first reference signals and N3 third reference signals, the second reference signal is used to detect a link failure, the third reference signal meets a quasi co-location QCL assumption relationship with a physical downlink control channel PDCCH, and M, N1, N2, N3, and P are integers greater than or equal to 1.

In a possible design, the P resources are associated with a reference signal other than a target reference signal in the N1 first reference signals, and the target reference signal is at least one of the N2 second reference signals and/or at least one of the N3 third reference signals.

In a possible design, the sending module 1901 is further configured to:

send second signaling to the terminal device, where the second signaling indicates the N3 third reference signals, and at least one of the N3 third reference signals is the target reference signal.

In a possible design, the second signaling is used to instruct the terminal device to detect a link failure by using the target reference signal in the N1 first reference signals; or the second signaling is used to instruct the terminal device to detect a link failure by using the N3 third reference signals; or the second signaling is used to indicate QCL information of the N2 second reference signals.

In a possible design, the second signaling is used to instruct to forbid the terminal device to identify a new link by using the target reference signal; or the second signaling is used to instruct the terminal device to identify a new link by using a reference signal other than the target reference signal in the N1 first reference signals.

In a possible design, the sending module 1901 is further configured to:

send third signaling to the terminal device, where the third signaling indicates the N2 second reference signals, and at least one of the N2 second reference signals is the target reference signal.

In a possible design, the third signaling is used to instruct to forbid the terminal device to identify a new link by using the target reference signal; or the third signaling is used to instruct the terminal device to identify a new link by using a reference signal other than the target reference signal in the N1 first reference signals.

In a possible design, the sending module 1901 is further configured to:

send fourth signaling to the terminal device, where the fourth signaling indicates K1 first reference signals, the P resources are associated with the K1 first reference signals, the N1 first reference signals include the K1 first reference signals, and K1 is an integer greater than or equal to 1 and less than or equal to N1.

In a possible design, the sending module 1901 is further configured to:

send fifth signaling to the terminal device, where the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1.

In a possible design, the sending module 1901 is further configured to:

send sixth signaling to the terminal device, where the sixth signaling indicates L resources used to carry the link recovery request signal, and the P resources are resources other than the L resources in the M resources or the P resources are the L resources.

In a possible design, the first signaling, the second signaling, the third signaling, the fourth signaling, the fifth signaling, and the sixth signaling each are at least one of layer 1 signaling, layer 2 signaling, and layer 3 signaling.

All related content of the steps in the foregoing method embodiments may be cited in function descriptions of the corresponding function modules. Details are not described herein again.

Figure 20:
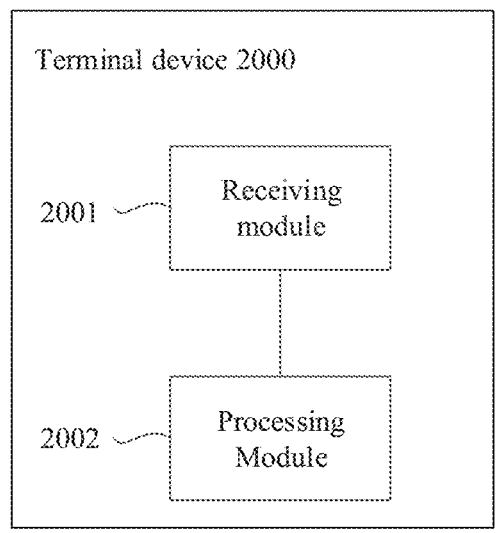
FIG. 20 is a possible schematic structural diagram of a terminal device according to an embodiment of this application.

FIG. 20 is a possible schematic structural diagram of a terminal device 2000. The terminal device 2000 may implement functions of the UE in the foregoing embodiments. The terminal device 2000 includes a receiving module 2001 and a processing module 2002.

The receiving module 2001 is configured to receive first signaling sent by a network device.

The first signaling is used to configure M resources used to carry a link recovery request signal, the link recovery request signal is a signal used to recover a communication link between the terminal device and the network device or reconfigure a new link when the communication link fails, the M resources are associated with N1 first reference signals, and the first reference signal is used to identify a new link.

The processing module 2002 is configured to select, from P resources used to carry the link recovery request signal, at least one resource used to carry and send the link recovery request signal.

The M resources include the P resources, the P resources are resources determined by the terminal device based on the N1 first reference signals and N2 second reference signals and/or the P resources are resources determined by the terminal device based on the N1 first reference signals and N3 third reference signals, the second reference signal is used to detect a link failure, the third reference signal meets a quasi co-location QCL assumption relationship with a physical downlink control channel PDCCH, and M, N1, N2, N3, and P are integers greater than or equal to 1.

In a possible design, the P resources are associated with a reference signal other than a target reference signal in the N1 first reference signals, and the target reference signal is at least one of the N2 second reference signals and/or at least one of the N3 third reference signals.

In a possible design, the receiving module 2001 is further configured to:

receive second signaling sent by the network device, where the second signaling indicates the N3 third reference signals, and at least one of the N3 third reference signals is the target reference signal.

In a possible design, the second signaling is used to instruct the terminal device to detect a link failure by using the target reference signal in the N1 first reference signals: or the second signaling is used to instruct the terminal device to detect a link failure by using the N3 third reference signals: or the second signaling is used to indicate QCL information of the N2 second reference signals.

In a possible design, the second signaling is used to instruct to forbid the terminal device to identify a new link by using the target reference signal: or the second signaling is used to instruct the terminal device to identify a new link by using a reference signal other than the target reference signal in the N1 first reference signals.

In a possible design, the receiving module 2001 is further configured to:

receive third signaling sent by the network device, where the third signaling indicates the N2 second reference signals, and at least one of the N2 second reference signals is the target reference signal.

In a possible design, the third signaling is used to instruct to forbid the terminal device to identify a new link by using the target reference signal; or the third signaling is used to instruct the terminal device to identify a new link by using a reference signal other than the target reference signal in the N1 first reference signals.

In a possible design, the receiving module 2001 is further configured to:

receive fourth signaling sent by the network device, where the fourth signaling indicates K1 first reference signals, the P resources are associated with the K1 first reference signals, the N1 first reference signals include the K1 first reference signals, and K1 is an integer greater than or equal to 1 and less than or equal to N1.

In a possible design, the receiving module 2001 is further configured to:

receive fifth signaling sent by the network device, where the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1.

In a possible design, the receiving module 2001 is further configured to:

receive sixth signaling sent by the network device, where the sixth signaling indicates L resources used to carry the link recovery request signal, and the P resources are resources other than the L resources in the M resources or the P resources are the L resources.

In a possible design, the first signaling, the second signaling, the third signaling, the fourth signaling, the fifth signaling, and the sixth signaling each are at least one of layer 1 signaling, layer 2 signaling, and layer 3 signaling.

All related content of the steps in the foregoing method embodiments may be cited in function descriptions of the corresponding function modules. Details are not described herein again.

In the embodiments of this application, the network device 1900 and the terminal device 2000 are presented in a form of division into the functional modules corresponding to the functions, or may be presented in a form of integrating the functional modules. The "module" herein may be an application-specific integrated circuit (application-specific integrated circuit, ASIC), a processor for executing one or more software or firmware programs, a memory, an integrated logic circuit, and/or another component that may provide the foregoing functions.

Figure 21:
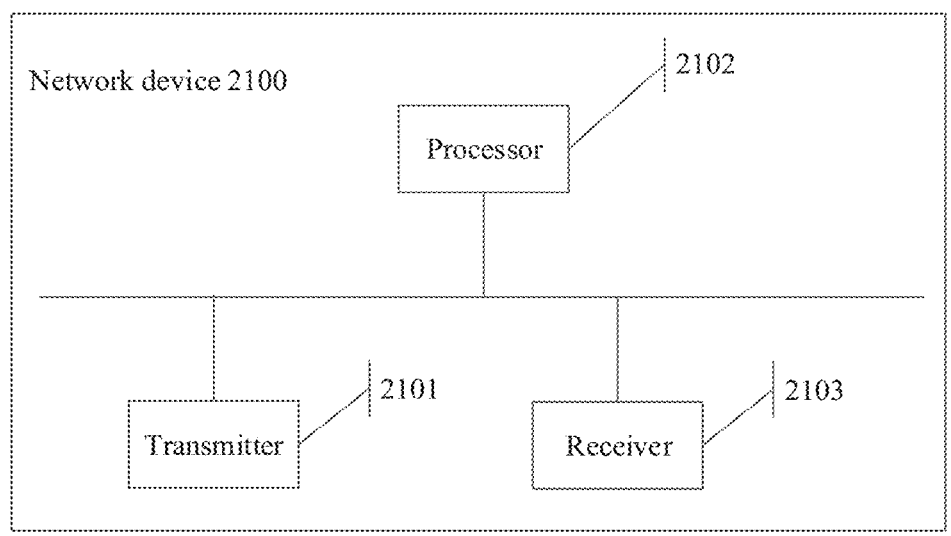
FIG. 21 is another possible schematic structural diagram of a network device according to an embodiment of this application.
Figure 22:
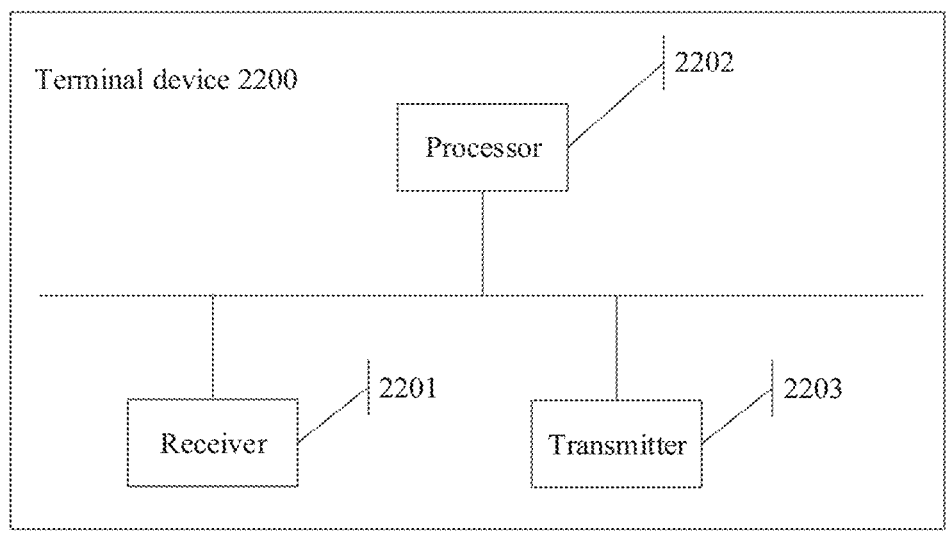
FIG. 22 is another possible schematic structural diagram of a terminal device according to an embodiment of this application.

In a simple embodiment, a person skilled in the art may figure out that the network device 1900 may be further implemented in a structure shown in FIG. 21, and the terminal device 2000 may be implemented in a structure shown in FIG. 22. The following describes the structures shown in FIG. 21 and FIG. 22.

As shown in FIG. 21, a network device 2100 may include a transmitter 2101, a processor 2102, and a receiver 2103. In actual application, an entity device corresponding to the sending module 1901 in FIG. 19 may be the transmitter 2101, and an entity device corresponding to the processing module 1902 may be the processor 2102.

The processor 2102 may be a central processing unit (CPU) or an application-specific integrated circuit (Application Specific Integrated Circuit. ASIC), may be one or more integrated circuits configured to control program execution, or may be a baseband chip, or the like.

The device may further include a memory. The memory may be connected to the processor 2102 by using a bus structure, a star structure, or another structure, or may be separately connected to the processor 2102 by using a dedicated connection line. In FIG. 21, the bus structure is used as an example. There may be one or more memories. The memory may be a read-only memory (Read Only Memory, ROM), a random access memory (Random Access Memory, RAM), a magnetic disk memory, or the like.

The transmitter 2101 is configured to send, under control of the processor 2102, first signaling to a terminal device.

The first signaling is used to configure M resources used to carry a link recovery request signal, the link recovery request signal is a signal used to recover a communication link between the terminal device and the network device or reconfigure a new link when the communication link fails, the M resources are associated with N1 first reference signals, and the first reference signal is used to identify a new link.

The receiver 2103 is configured to detect, under control of the processor 2102, the link recovery request signal from P resources used to carry the link recovery request signal.

The M resources include the P resources, the P resources are resources determined by the network device based on the N1 first reference signals and N2 second reference signals and/or the P resources are resources determined by the network device based on the N1 first reference signals and N3 third reference signals, the second reference signal is used to detect a link failure, the third reference signal meets a quasi co-location QCL assumption relationship with a physical downlink control channel PDCCH, and M, N1, N2, N3, and P are integers greater than or equal to 1.

In a possible design, the P resources are associated with a reference signal other than a target reference signal in the N1 first reference signals, and the target reference signal is at least one of the N2 second reference signals and/or at least one of the N3 third reference signals.

In a possible design, the transmitter 2101 is further configured to:

send second signaling to the terminal device, where the second signaling indicates the N3 third reference signals, and at least one of the N3 third reference signals is the target reference signal.

In a possible design, the second signaling is used to instruct the terminal device to detect a link failure by using the target reference signal in the N1 first reference signals; or the second signaling is used to instruct the terminal device to detect a link failure by using the N3 third reference signals; or the second signaling is used to indicate QCL information of the N2 second reference signals.

In a possible design, the second signaling is used to instruct to forbid the terminal device to identify a new link by using the target reference signal; or the second signaling is used to instruct the terminal device to identify a new link by using a reference signal other than the target reference signal in the N1 first reference signals.

In a possible design, the transmitter 2101 is further configured to:

send third signaling to the terminal device, where the third signaling indicates the N2 second reference signals, and at least one of the N2 second reference signals is the target reference signal.

In a possible design, the third signaling is used to instruct to forbid the terminal device to identify a new link by using the target reference signal: or the third signaling is used to instruct the terminal device to identify a new link by using a reference signal other than the target reference signal in the N1 first reference signals.

In a possible design, the transmitter 2101 is further configured to:

send fourth signaling to the terminal device, where the fourth signaling indicates K1 first reference signals, the P resources are associated with the K1 first reference signals, the N1 first reference signals include the K1 first reference signals, and K1 is an integer greater than or equal to 1 and less than or equal to N1.

In a possible design, the transmitter 2101 is further configured to:

send fifth signaling to the terminal device, where the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1.

In a possible design, the transmitter 2101 is further configured to:

send sixth signaling to the terminal device, where the sixth signaling indicates L resources used to carry the link recovery request signal, and the P resources are resources other than the L resources in the M resources or the P resources are the L resources.

In a possible design, the first signaling, the second signaling, the third signaling, the fourth signaling, the fifth signaling, and the sixth signaling each are at least one of layer 1 signaling, layer 2 signaling, and layer 3 signaling.

As shown in FIG. 22, a terminal device 2200 may include a receiver 2201, a processor 2202, and a transmitter 2203. In actual application, an entity device corresponding to the receiving module 2001 in FIG. 20 may be the receiver 2201, and an entity device corresponding to the processing module 2002 may be the processor 2202.

The processor 2202 may be a central processing unit (CPU) or an application-specific integrated circuit (Application Specific Integrated Circuit, ASIC), may be one or more integrated circuits configured to control program execution, or may be a baseband chip, or the like.

The device may further include a memory. The memory may be connected to the processor 2202 by using a bus structure, a star structure, or another structure, or may be separately connected to the processor 2202 by using a dedicated connection line. In FIG. 22, the bus structure is used as an example. There may be one or more memories. The memory may be a read-only memory (Read Only Memory, ROM), a random access memory (Random Access Memory, RAM), a magnetic disk memory, or the like.

The receiver 2201 is configured to receive, under control of the processor 2202, first signaling sent by a network device.

The first signaling is used to configure M resources used to carry a link recovery request signal, the link recovery request signal is a signal used to recover a communication link between the terminal device and the network device or reconfigure a new link when the communication link fails, the M resources are associated with N1 first reference signals, and the first reference signal is used to identify a new link.

The transmitter 2203 is configured to select, under control of the processor 2202 from P resources used to carry the link recovery request signal, at least one resource used to carry and send the link recovery request signal.

The M resources include the P resources, the P resources are resources determined by the terminal device based on the N1 first reference signals and N2 second reference signals and/or the P resources are resources determined by the terminal device based on the N1 first reference signals and N3 third reference signals, the second reference signal is used to detect a link failure, the third reference signal meets a quasi co-location QCL assumption relationship with a physical downlink control channel PDCCH, and M, N1, N2, N3, and P are integers greater than or equal to 1.

In a possible design, the P resources are associated with a reference signal other than a target reference signal in the N1 first reference signals, and the target reference signal is at least one of the N2 second reference signals and/or at least one of the N3 third reference signals.

In a possible design, the receiver 2201 is further configured to:

receive second signaling sent by the network device, where the second signaling indicates the N3 third reference signals, and at least one of the N3 third reference signals is the target reference signal.

In a possible design, the second signaling is used to instruct the terminal device to detect a link failure by using the target reference signal in the N1 first reference signals; or the second signaling is used to instruct the terminal device to detect a link failure by using the N3 third reference signals; or the second signaling is used to indicate QCL information of the N2 second reference signals.

In a possible design, the second signaling is used to instruct to forbid the terminal device to identify a new link by using the target reference signal; or the second signaling is used to instruct the terminal device to identify a new link by using a reference signal other than the target reference signal in the N1 first reference signals.

In a possible design, the receiver 2201 is further configured to:

receive third signaling sent by the network device, where the third signaling indicates the N2 second reference signals, and at least one of the N2 second reference signals is the target reference signal.

In a possible design, the third signaling is used to instruct to forbid the terminal device to identify a new link by using the target reference signal; or the third signaling is used to instruct the terminal device to identify a new link by using a reference signal other than the target reference signal in the N1 first reference signals.

In a possible design, the receiver 2201 is further configured to:

receive fourth signaling sent by the network device, where the fourth signaling indicates K1 first reference signals, the P resources are associated with the K1 first reference signals, the N1 first reference signals include the K1 first reference signals, and K1 is an integer greater than or equal to 1 and less than or equal to N1.

In a possible design, the receiver 2201 is further configured to:

receive fifth signaling sent by the network device, where the fifth signaling indicates K2 first reference signals, the P resources are associated with at least one first reference signal other than the K2 first reference signals in the N1 first reference signals, the N1 first reference signals include the K2 first reference signals, and K2 is an integer greater than or equal to 1 and less than or equal to N1.

In a possible design, the receiver 2201 is further configured to:

receive sixth signaling sent by the network device, where the sixth signaling indicates L resources used to carry the link recovery request signal, and the P resources are resources other than the L resources in the M resources or the P resources are the L resources.

In a possible design, the first signaling, the second signaling, the third signaling, the fourth signaling, the fifth signaling, and the sixth signaling each are at least one of layer 1 signaling, layer 2 signaling, and layer 3 signaling.

In a possible design, the network device 2100 and the terminal device 2200 may be a field-programmable gate array (field-programmable gate array, FPGA), an application-specific integrated circuit (application specific integrated circuit, ASIC), a system on chip (system on chip, SoC), a central processing unit (central processor unit, CPU), a network processor (network processor, NP), a digital signal processor (digital signal processor, DSP), a micro controller (micro controller unit, MCU), a programmable logic device (programmable logic device, PLD), or another integrated chip.

The network device and the terminal device provided in this application each may be a chip system, and the chip system may include at least one chip, and may further include another discrete component. The chip system may be disposed in a network device or a terminal device, to support the network device or the terminal device in completing the link recovery method provided in the embodiments of this application.

An embodiment of this application provides a computer storage medium. The computer storage medium stores an instruction; when the instruction is run on a computer, the computer is enabled to perform the foregoing link recovery method.

An embodiment of this application provides a computer program product. The computer program product includes an instruction; when the instruction is run on a computer, the computer is enabled to perform the foregoing link recovery method.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), and or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A link recovery method, comprising: receiving, by a terminal device from a network device, a first signaling a second signaling, and a third signaling, wherein the first signaling indicates one or more reference signals for detecting channel quality of an existing link, the second signaling indicates quasi co-location (QCL) information of a physical downlink control channel (PDCCH) and QCL information of the one or more reference signals, the third signaling configures M random access channel (RACH) resources for link recovery, the M RACH resources correspond to N reference signals configured for identifying a new link, wherein the one or more reference signals correspond to one or more RACH resources comprised in the M RACH resources, and wherein the N reference signals comprise the one or more reference signals, determining, by the terminal device based on the first signaling, that the channel quality of the existing link is worse than a threshold, selecting, by the terminal device, at least one RACH resource from P RACH resources in the M RACH resources, wherein the P RACH resources are a remainder of the M RACH resources other than the one or more RACH resources corresponding to the one or more reference signals, and transmitting, by the terminal device to a network device, the link recovery request by using the at least one RACH resource selected from the P RACH resources.

2. A terminal device, comprising: at least one processor, one or more memories coupled to the at least one processor and storing programming instructions for execution by the at least one processor to perform operations comprising: receiving, a first signaling a second signaling and a third signaling sent by a network device, wherein the first signaling indicates one or more reference signals for detecting channel quality of an existing link, the second signaling indicates quasi co-location (QCL) information of a physical downlink control channel (PDCCH) and QCL information of the one or more reference signals, the third signaling configures M random access channel (RACH) resources for link recovery, the M RACH resources correspond to N reference signals configured for identifying a new link, wherein the one or more reference signals correspond to one or more RACH resources comprised in the M RACH resources, and wherein the N reference signals comprise the one or more reference signals, determining, by the terminal device based on the first signaling, that the channel quality of the existing link k worse than a threshold, selecting, by the terminal device, at least one RACH resource from P RACH resources in the M RACH resources, wherein the P RACH resources are a remainder of the M RACH resources other than the one or more RACH resources corresponding to the one or more reference signals, and transmitting, by the terminal device to a network device, the link recovery request by using the at least one RACH resource selected from the P RACH resources.

3. A non-transitory, computer-readable medium, storing one or more instructions executable by a terminal device to perform operations comprising: receiving, from a network device, a first signaling a second signaling and a third signaling, wherein the first signaling indicates one or more reference signals for detecting channel quality of an existing link, the second signaling indicates quasi co-location (QCL) information of a physical downlink control channel (PDCCH) and QCL information of the one or more reference signals, the third signaling configures M random access channel (RACH) resources for link recovery, the M RACH resources correspond to N reference signals configured for identifying a new link, wherein the one or more reference signals correspond to one or more RACH resources comprised in the M RACH resources, and wherein the N reference signals comprise the one or more reference signals; determining, by the terminal device based on the first signaling, that the channel quality of the existing link is worse than a threshold, selecting, by the terminal device, at least one RACH resource from P RACH resources in the M RACH resources, wherein the P RACH resources are a remainder of the M RACH resources other than the one or more RACH resources corresponding to the one or more reference signals, and transmitting, by the terminal device to a network device, the link recovery request by using the at least one RACH resource selected from the P RACH resources.

4. A computer program product comprising one or more instructions executable by a terminal device to perform operations comprising: receiving, from a network device, a first signaling a second signaling and a third signaling, wherein the first signaling indicates one or more reference signals for detecting channel quality of an existing link, the second signaling indicates quasi co-location (QCL) information of a physical downlink control channel (PDCCH) and QCL information of the one or more reference signals, the third signaling configures M random access channel (RACH) resources for link recovery, the M RACH resources correspond to N reference signals configured for identifying a new link, wherein the one or more reference signals correspond to one or more RACH resources comprised in the M RACH resources, and wherein the N reference signals comprise the one or more reference signals, determining, by the terminal device based on the first signaling, that the channel quality of the existing link is worse than a threshold, selecting, by the terminal device, at least one RACH resource from P RACH resources in the M RACH resources, wherein the P RACH resources are a remainder of the M RACH resources other than the one or more RACH resources corresponding to the one or more reference signals, and transmitting, by the terminal device to a network device, the link recovery request by using the at least one RACH resource selected from the P RACH resources.

\* \* \* \* \*

UNITED STATES PATENT AND TRADEMARK OFFICE
CERTIFICATE OF CORRECTION

PATENT NO. : 11,290,199 B2
APPLICATION NO. : 16/883683
DATED : March 29, 2022
INVENTOR(S) : Di Zhang and Kunpeng Liu It is certified that error appears in the above-identified patent and that said Letters Patent is hereby corrected as shown below:

In the Claims

In Column 34 Line 65 In Claim 2, delete "k" and insert --is--.

Signed and Sealed this
Seventh Day of June, 2022

Katherine Kelly Vidal
*Director of the United States Patent and Trademark Office*